United States Patent
Ohsaki et al.

(10) Patent No.: US 6,878,360 B1
(45) Date of Patent: Apr. 12, 2005

(54) CARBON FIBROUS MATTER, PRODUCTION DEVICE OF CARBON FIBROUS MATTER, PRODUCTION METHOD OF CARBON FIBROUS MATTER AND DEPOSIT PREVENTION DEVICE FOR CARBON FIBROUS MATTER

(75) Inventors: Takashi Ohsaki, Haibara-machi (JP); Fumio Kawamura, Haibara-machi (JP)

(73) Assignee: Nikkiso Company Limited, Tokyo (JP)

(*) Notice: Subject to any disclaimer, the term of this patent is extended or adjusted under 35 U.S.C. 154(b) by 0 days.

(21) Appl. No.: 10/070,109
(22) PCT Filed: Sep. 1, 2000
(86) PCT No.: PCT/JP00/05964
§ 371 (c)(1), (2), (4) Date: Jun. 20, 2002
(87) PCT Pub. No.: WO01/16414
PCT Pub. Date: Mar. 8, 2001

(30) Foreign Application Priority Data

Sep. 1, 1999 (JP) .......... 11-247710
Oct. 8, 1999 (JP) .......... 11-288496

(51) Int. Cl.[7] .................. D01F 9/12
(52) U.S. Cl. .......... 423/447.3; 423/447.1; 422/150; 422/152; 422/158; 239/418; 239/421
(58) Field of Search .......... 423/447.3, 447.1, 423/447.2, 445 R, 450, 458; 422/152, 158, 150; 239/418, 421

(56) References Cited

U.S. PATENT DOCUMENTS

| | | | | |
|---|---|---|---|---|
| 4,572,813 A | * | 2/1986 | Arakawa | 264/29.2 |
| 4,816,289 A | * | 3/1989 | Komatsu et al. | 423/447.3 |
| 5,024,818 A | | 6/1991 | Tibbetts et al. | 422/158 |
| 5,102,647 A | | 4/1992 | Yamada et al. | 423/447.3 |

FOREIGN PATENT DOCUMENTS

| | | | | |
|---|---|---|---|---|
| JP | 61108723 | 5/1986 | | D01F/9/12 |
| WO | WO 8603455 | 6/1986 | | B32B/9/00 |

* cited by examiner

Primary Examiner—Stanley S. Silverman
Assistant Examiner—Peter J Lish
(74) Attorney, Agent, or Firm—Webb Ziesenheim Logsdon Orkin & Hanson, P.C.

(57) ABSTRACT

Disclosed is an apparatus for production of vapor-phase growth carbon fibers. The apparatus can continuously produce these carbon fibers for a long time without blocking a furnace of tubular reactor of the apparatus. Also disclosed is a process for production of carbon fibers by means of the apparatus, a device for preventing deposition of carbon fibers on an inside of a furnace of tubular reactor, and vapor-phase growth carbon fibers produced in the apparatus.

The vapor-phase growth carbon fibers include carbon nanofibers and/or carbon nanotubes. The apparatus includes a furnace of tubular reactor, at an end of which a feedstock-supplying nozzle is provided, and a discharge pipe inserted in the furnace of tubular reactor, the top end of which faces the opening of the nozzle and the bottom end discharges the carbon fibers.

13 Claims, 6 Drawing Sheets

CARBON FIBROUS MATTER, PRODUCTION DEVICE OF CARBON FIBROUS MATTER, PRODUCTION METHOD OF CARBON FIBROUS MATTER AND DEPOSIT PREVENTION DEVICE FOR CARBON FIBROUS MATTER

BACKGROUND OF THE INVENTION

1. Field of the Invention

This invention relates to an apparatus for production of carbon fibrous materials, a process for production of carbon fibrous materials, a device for preventing the deposition of carbon fibrous materials, and the carbon fibrous materials produced by the process, apparatus and device. More particularly, this invention relates to an apparatus for production of carbon fibrous materials, which has a furnace of tubular reactor such as a vertical furnace of tubular reactor having such a structure that the reactor can hardly be blocked in the inside thereof, a process for production of the carbon fibrous materials using the apparatus, a device for preventing the deposition of the carbon fibrous materials on the inside surface of the furnace of tubular reactor such as a vertical furnace of tubular reactor, and the carbon fibrous materials produced by the apparatus, device and process.

2. Description of Related Art

As an apparatus for production of vapor-phase growth carbon fibers there has hitherto been known an apparatus having a furnace of tubular reactor such as a vertical furnace of tubular reactor.

This apparatus is provided at the upper portion of the vertical furnace of tubular reactor thereof with a feedstock-supplying means for introducing a carrier gas, a gaseous metal catalyst source including a metal catalyst and a gaseous hydrocarbon as a carbon source into the furnace of tubular reactor, a gas-flow rectifying means for rectifying the gas supplied by the feedstock-supplying means to allow the gas to flow downwardly through the furnace of tubular reactor, and a heating means for heating the inside of the furnace of tubular reactor, which is placed to surround the furnace of tubular reactor.

In the prior art apparatus as mentioned above, the gaseous metal catalyst source and hydrocarbon gas are introduced into the heated vertical furnace of tubular reactor together with the carrier gas. The introduced gases are rectified by the gas-flow rectifying means to allow them to pass through the furnace of tubular reactor. The carbon fibers are grown in the heated furnace of tubular reactor.

There have been provided some theories on the mechanism through which carbon fibers are produced in the furnace of tubular reactor. According to one of the theories, a compound for the metal catalyst source introduced in the furnace of tubular reactor is decomposed to form the metal catalyst, and simultaneously the carbon source is decomposed, to thereby produce the carbon fibers. According to another theory, the metal catalyst source is decomposed in the furnace of tubular reactor to form molten metal droplets, into contact with which is then brought the carbon source to result in the decomposition of the carbon source. The resulting carbon is longitudinally grown up with the metal being a core to produce the carbon fibers.

Apart from the mechanism, the resulting carbon fibers are entrained on the streamline flow rectified to pass downwardly through the furnace of tubular reactor, and reach, with help of the carrier gas, the carbon fibers-collecting means such as a means called as a carbon fibers-collector or trapping box via the lower opening of the furnace of tubular reactor.

However, this apparatus as the prior art has the following problem.

This problem is such that, when the carbon fibers are produced in a vapor phase with a molten metal as nuclei formed in the furnace of tubular reactor, fibrous products are deposited on the inside surface of the furnace of tubular reactor.

Some theories on the causes for the deposition of the fibrous products on the inside surface of the furnace of tubular reactor may be considered. For example, according to the first theory, the metal catalyst source is decomposed to form the molten metal, which is then deposited on the inside surface of the furnace of tubular reactor and becomes nuclei, on which the fibrous products are formed by a so-called "growth on substrates". According to the second theory, the metal catalyst source is deposited and then decomposed on the inside surface of the furnace of tubular reactor to form the metal as nuclei, on which the fibrous products are formed by the growth on substrates. According to the third theory, the carbon fibers produced in a vapor phase in the furnace of tubular reactor are deposited on the inside surface of the furnace of tubular reactor and then grown up longitudinally and/or radially. According to the fourth theory, the above-mentioned theories are combined.

Apart from these theories, once the fibrous products are formed on the inside surface of the furnace of tubular reactor, the carbon fibers formed in vapor phase and falling down through the reactor are deposited on the fibrous products, thus forming an increased amount of the fibrous products different in length and thickness, which finally block the reactor. The blocking of the reactor forces an operator to interrupt the production of the carbon fibers and clean the inside of the reactor, which is very inconvenient to industrial operation.

Furthermore, a pyrolytic carbon layer is formed in the fibrous products deposited on the inside surface of the reactor and the carbon fibers deposited on the fibrous products, and causes the physical properties of the carbon to be inferior as the diameter of the fibers gets greater.

The "vapor-phase growth carbon fibers" used herein means carbon fibers grown in a vapor phase from a compound as a carbon source in the presence of ultrafine particulate nuclei of a metal such as a transition metal. Therefore, the vapor-phase growth carbon fibers contain the ultrafine particulate nuclei of a metal such as a transition metal at the end thereof and are hollow. The graphite network planes of the carbon fibers are stacked like growth rings of wood with the c-axis thereof being rectangular to the axis of the fibers. In other words, the carbon fibers have the graphite network planes stacked to be parallel to the axis of the carbon fibers. The vapor-phase growth carbon fibers may contain fibers generally called as carbon nanotubes or carbon nanofibers. The carbon nanotubes cannot clearly be distinguished from the carbon nanofibers. It is often roughly said that the carbon nanotubes have a diameter of one to smaller than twenty of nanometer, and the carbon nanofibers have a diameter of several tens to one hundred of nanometer. Furthermore, the vapor-phase growth carbon fibers may include hollow fibers having a diameter of smaller than one hundred nm, which were produced at so low a temperature that the metal catalyst particles cannot be molten, with the graphite network planes being conically stacked at an angle of several tens of degree against the fiber axis, and fibrous products of a peculiar shape such as a plate or ribbon shape having a cross-section of smaller than one hundred nm in a longer side with the graphite planes being almost rectangular to the fiber axis.

The above-mentioned problem is more easily caused in a horizontal furnace of tubular reactor, in which many individual flows by convection are more easily produced at the different sites of the reactor, than in the vertical furnace of tubular reactor. In order to overcome this problem, the carrier gas was allowed to flow through the reactor on the inside surface thereof, so that the metal catalyst source, molten metal or carbon fibers cannot be deposited on the inside surface of the reactor. However, the production of the fibrous products on the inside surface of the reactor can be prevented to some extent, but cannot completely be prevented.

As a means for removing the fibrous products from the inside surface of the reactor, were proposed such systems that the reactor in which heat-resisting ceramic balls are placed is rotated, and that the fibrous products deposited on the inside surface of the reactor are intermittently scraped off with a means such as a spatula or rake.

The system using the heat-resisting ceramic balls caused not only the turbulence of the streamline gas flowing through the reactor, but also the degradation of the properties of the vapor-phase growth carbon fibers because of deposition in thickness of the fibers deposited on the heat-resisting ceramic balls. That is, there is such a problem that highly crystalline and hollow carbon fibers cannot efficiently be produced.

In the scraping-off system, the intermittent scraping steps cause the deposition in thickness of the fibers deposited on the inside surface of the reactor, and the permanent presence of the scraping means in the reactor causes the turbulence of the streamline gas flow, rather resulting in a new problem that the deposited amount of the fibrous products may increase.

Thus, the prior art apparatus necessitates the periodic removing operation, for example, at an interval of several minutes. Therefore, the apparatus must be stopped in each of the removing steps, so that the continuous and efficient production of carbon fibers cannot be attained with the prior art apparatus.

The prior art apparatus has the other problems as mentioned below. At the end of the furnace of tubular reactor there are provided feedstock-supplying nozzles for introducing the carbon source gas and the metal catalyst source. There occurs a problem that these feedstock-supplying nozzles are heated inside with a heater to such a temperature in the reactor that the carbon source gas and the metal catalyst source may be decomposed, so that both the sources are decomposed in the nozzles to form the decomposition products, which block the nozzles. In order to remove such a problem, i.e., not to cause the temperature of the nozzles to reach such a temperature that the carbon source and the metal catalyst source are decomposed, the prior art apparatus is provided with any nozzle-cooling means. Thus, the feedstock having a lower temperature than the decomposing temperature is introduced into the reactor, so that the feedstock hardly reaches the decomposing temperature rapidly. As a result, the prior art apparatus has such a defect that the desired vapor-phase growth carbon fibers cannot efficiently be produced.

Of the vapor-phase growth carbon fibers, the carbon nanofibers or carbon nanotubes free of the pyrolytic carbon fiber layer have a relatively high degree of graphitization without subjecting to any particular step of graphitization, and a high electric conductive. However, the productivity thereof is low, because they have a very small thickness and do not grow in thickness. Therefore, the improvement of the productivity has been demanded.

The object of this invention is to an apparatus for production of carbon fibrous materials, the furnace of tubular reactor, particularly vertical furnace of tubular reactor of which apparatus is not blocked with carbon fibers, particularly carbon fibrous materials such as carbon nanofibers or carbon nanotubes, thus realizing the efficient, continuous production of the carbon fibrous materials, but nevertheless, not making the whole size of the apparatus larger.

Another object of this invention is to provide an apparatus for production of carbon fibrous materials, which apparatus can be continued to run for a long period of time, because the furnace of tubular reactor, particularly vertical furnace of tubular reactor is inhibited from being blocked as it possibly can.

A further object of this invention is provide a process for efficient, continuous production of carbon fibrous materials, such as vapor-phase growth carbon fibers, particularly carbon nanofibers or carbon nanotubes.

A still further object of this invention is to provide a device for preventing the deposition of carbon fibrous products on the inside surface of the furnace of tubular reactor, particularly vertical furnace of tubular reactor, in producing carbon fibrous materials, such as vapor-phase growth carbon fibers, particularly carbon nanofibers or carbon nanotubes in the furnace of tubular reactor.

An additional object of this invention is to provide vapor-phase growth carbon fibers including carbon nanotubes or carbon nanofibers, which have a diameter of about 100 nm and below, especially about 50 nm and below, and contain a central hollow core along the axis of the fibers, which core portion is surrounded in parallel by one or more layers of hexagonal crystal plane consisting of carbons, which has a shape like growth rings of wood in the cross section.

SUMMARY OF THE INVENTION

In order to overcome the above-mentioned problems and attain the above-mentioned objects, the apparatus for production of carbon fibrous materials according to this invention comprises a reactor means comprising a furnace of tubular reactor having a reaction zone for production of the carbon fibrous materials by thermal decomposition of a gaseous carbon source and a metal catalyst source, and a feedstock-supplying means for supplying the carbon source and the metal catalyst source to the furnace of tubular reactor;

a discharging means comprising a discharge pipe having an opening for charging at least one of the carbon fibrous materials and the carbon sources/metal catalyst source and the other opening for discharging the carbon fibrous materials to the outside, said discharging means being positioned to face said feedstock-supplying means or the reaction zone; and a guide gas-supplying means for supplying a guide gas in such a manner that said guide gas countercurrently flows to the opening of the discharge pipe and then through the inside of the discharge pipe.

Furthermore, the apparatus of this invention is characterized in that said furnace of tubular reactor is of a vertical type and has the feedstock-supplying means at the top of the reactor means and the discharging means at the bottom of the reactor means.

This invention provides a process for production of the carbon fibrous materials, characterized in that the carbon fibrous materials produced by thermal decomposition of the metal catalyst source and the carbon source are sucked at the opening of the discharge pipe of the discharging means together with a guide gas supplied the guide gas-supplying means and collected.

This invention provides a process for production of the carbon fibrous materials, characterized by taking the metal catalyst source and carbon source supplied through the feedstock-supplying means positioned at the end of the furnace of tubular reactor of the apparatus together with the guide gas allowed to pass through the guide gas-supplying means and the interstice between the inner surface of the furnace of tubular reactor and the outer surface of the discharge pipe, into the discharge pipe at the opening thereof positioned to face the end opening of said nozzle, and then thermally decomposing the sources in the discharge pipe positioned in the reaction zone of the furnace of tubular reactor.

This provides a device for preventing the carbon fibrous materials from being deposited, characterized by being provided with a discharging means having a discharge pipe, into which is taken at least one of the carbon fibrous materials, carbon source and metal catalyst source at the opening thereof and discharged the carbon fibrous materials to the outside of the discharging means, said discharge pipe being positioned to face one of the feedstock-supplying means for introducing the carbon source and the metal catalyst source into the furnace of tubular reactor and the reaction zone for producing the carbon fibrous materials, and a guide gas-supplying means for allowing the guide gas to pass through the end of the furnace of tubular reactor, the opening of the discharge pipe and then the inside of the discharge pipe.

This invention provides carbon fibrous materials formed by thermal decomposition of the metal catalyst source and the carbon source in the reaction zone of the furnace of tubular reactor, said materials being charged into the discharge pipe from the reaction zone together with the guide gas upwardly rising on the circumferential surface of the discharge pipe and sucked into the inside of the discharge pipe at the opening thereof, and then collected.

This invention provides Carbon fibrous materials formed by thermal decomposition of a metal catalyst source and carbon source surrounded with guide gas in the inner of discharge pipe, said metal catalyst source and carbon source being supplied through a nozzle provided at one end of a furnace of tubular reactor, and then taken into the discharge pipe, which is inserted in the furnace of tubular reactor, at the opening thereof which is arranged to face and in proximity to the opening of said nozzle, said the guide gas being supplied by a guide gas-supplying means and upwardly rising through the space constituted by the furnace of tubular reactor and the discharge pipe to sucked into the inside of discharge pipe.

DETAILED DESCRIPTION OF THE PREFERRED EMBODIMENTS

In the apparatus for production of vapor-phase growth carbon fibers according to one embodiment of this invention, the metal catalyst source and the gaseous carbon source are introduced into a discharge pipe at a nozzle at the end of the furnace of tubular reactor as the reactor means together with the carrier gas. The discharge pipe is sufficiently heated by the radiant heat of the heated furnace of tubular reactor and a heated guide gas. Therefore, both the sources are instantly thermally decomposed to form the vapor-phase growth carbon fibers, which are discharged from the discharge pipe. Accordingly, although the nozzle is cooled therein to such an extent that both the sources cannot be decomposed, there is no such inconvenience that the vapor-phase growth carbon fibers are not formed with a good efficiency due to the insufficient heating of both the sources. Furthermore, since the opening of the discharge pipe is positioned so as to face the nozzle and in proximity to the nozzle, the sources supplied from the nozzle are instantly introduced into the discharge pipe. Therefore, no products produced by decomposition of the sources are deposited on the inside surface of the furnace of tubular reactor. Still further, a guide gas is allowed to pass through an interstice between the inside surface of the furnace of tubular reactor and the outside surface of the discharge pipe. The guide gas envelopes the sources and charge them into the discharge pipe. Therefore, no products produced by the decomposition of the sources are deposited on the inside surface of the discharge pipe. The vapor-phase growth carbon fibers are discharged with the guide gas to the outside of the furnace of tubular reactor. Therefore, the apparatus of this invention has an advantage that it makes the continuous production of the vapor-phase growth carbon fibers possible.

Figure 1:
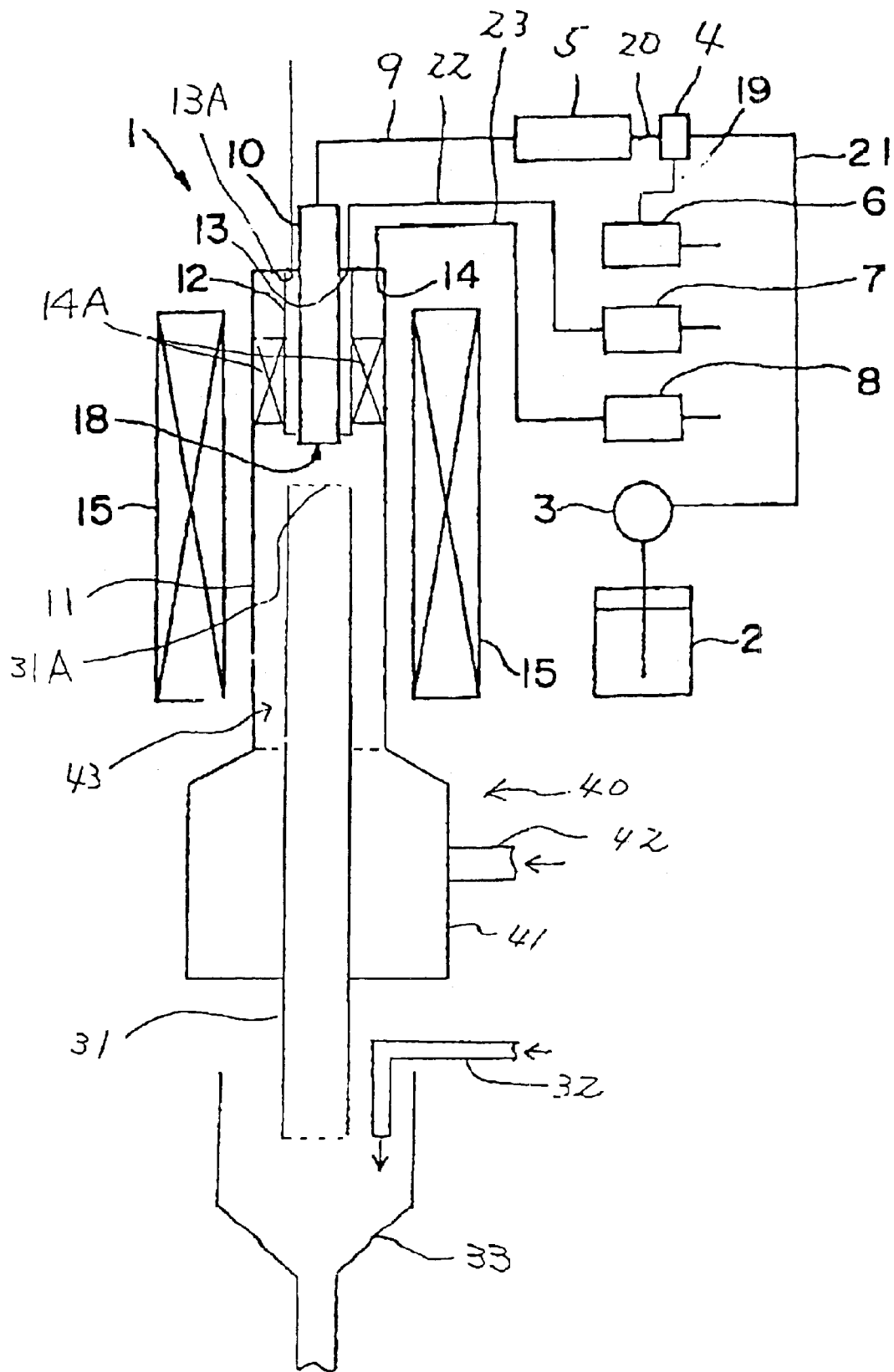
FIG. 1 is a schematical view of one embodiment of this invention.

An example of the apparatus for production of the vapor-phase growth carbon fibers according to this invention is shown in FIG. 1. However, this invention is not limited to this example.

The apparatus shown in FIG. 1 has a vertical furnace of tubular reactor. Therefore, the reactor means is of a vertical type. The concept of this invention may apply to both the vertical and horizontal furnace of tubular reactor. The vertical furnace of tubular reactor is preferred, because the unevenness of flow through the reactor hardly occurs and the flowing the feedstock gases and guide gas can relatively easily be controlled.

In FIG. 1, 1 represents an apparatus for production of vapor-phase growth carbon fibers, 2 a feedstock vessel containing a mixture of the carbon source and the metal catalyst source such as an organic metal compound, 3 a pump for removing the mixture from the vessel and controlling the amount of the mixture, 4 a preheater for preheating the mixture to a predetermined temperature, 5 a vaporizer for further heating the preheated mixture to vaporize the mixture to thereby prepare a gas having the same composition as that of the mixture, 6 a first mass-flow controller for controlling the amount of a carrier gas allowed to pass together with the vaporized mixture, 7 a flow meter for determining the amount of a cooling gas such as air or nitrogen gas to be supplied to a cooling jacket mounted on a nozzle for supplying the feedstock, 8 a second mass-flow controller for determining the amount of the carrier gas 9, a heat tube for maintaining the heated gaseous mixture at the predetermined temperature, 10 a cylindrical feedstock-supplying nozzle for introducing the gaseous mixture into a vertical furnace of tubular reactor at the top thereof, 11 the vertical furnace of tubular reactor, 12 a cooling jacket surrounding the feedstock-supplying nozzle, 13 a cooling gas inlet, 13A a cooling gas outlet for discharging the cooling gas supplied to cooling jacket 12, 14 a carrier gas-supplying nozzle, 14A a gas-flow rectifying means mounted on the end of the carrier gas-supplying nozzle, 15 is an electric heater, 18 the end opening of feedstock-supplying nozzle 10, 19 a pipe connecting the first mass-flow controller 6 to preheater 4, 20 a pipe, 21 a feedstock-supplying pipe for sending the mixture from pump 3 to vaporizer 5, 22 a pipe for sending the cooling gas to cooling jacket 12, 23 a pipe for sending the carrier gas to the gas-flow rectifying means 14A, 31 a discharge pipe, 31A an opening of the discharge pipe, 32 a driving gas-ejecting nozzle, 33 an ejector, 40 a guide gas-supplying means, 41 a guide gas uniform supply vessel in which the guide gas is contained, 42 a guide gas supply pipe, and 43 a part for rectifying and regulating the flow of the guide gas.

A preferred example of this invention will be illustrated below with reference to FIG. 1.

Reactor Means of Vertical Type

The reactor means of a vertical type as shown in FIG. 1 has a vertical furnace of tubular reactor having, for example, circular or quadrilateral shape in the cross-section transverse as same in the axis of the reactor as that of the reactor means.

The vertical furnace of tubular reactor is designed to thermally decompose the metal catalyst source and the gaseous carbon source supplied together with the carrier gas. According to this invention, a minor amount of the thermal decomposition may be conducted in the area between the feedstock-supplying nozzle and the opening of the discharge pipe, but the reactor means is designed to conduct a major amount of the thermal decomposition in the discharge pipe by arranging the opening of the discharge pipe in proximity to the feedstock-supplying nozzle.

As mentioned in detail later, the vertical furnace of tubular reactor is in general designed to reach the prescribed reaction temperature by providing a heater around the furnace of tubular reactor. However, the heater is not necessarily provided around the furnace of tubular reactor. For example, the thermal decomposition of the metal catalyst source and carbon source may be conducted in a stream of the carrier gas heated to a higher temperature than the prescribed temperature in the furnace of tubular reactor enveloped with a heat insulating material.

Since the vertical furnace of tubular reactor is heated to so high a temperature that the metal catalyst source and carbon source can be decomposed, and allows the carrier gas such as hydrogen gas to pass therethrough, it is preferably made by a material which is resistant to the high temperature brittle fracture and carburization, and may be, for example, a ceramics such as silicon carbide, silicon nitride, alumina, mullite, etc.

As the metal catalyst source, all the materials or compounds, which can be thermally decomposed to produce a metal catalyst may be used herein. As the metal catalyst source used herein, reference may be made to the organic transition metal compounds described on page 3, left upper column, line 9 to right upper column, the bottom line, of JP60-54998A; the organic transition metal compounds described in paragraph [0059] of JP9-324325A; and the organic transition metal compounds described in paragraph [0049] of JP9-78360A.

As the preferred metal catalyst source, the organic transition metal compound may be ferrocene or nickelocene, or a metal carbonyl such as iron carbonyl. The metal catalyst source may be used singly, or a plurality of the sources in combination.

The metal catalyst source may be used together with a cocatalyst. As the cocatalyst, there may be used any material, which can promote the formation of vapor-phase growth carbon fibers, such as carbon nanofibers or carbon nanotubes. For example, it may be a sulfur-containing heterocyclic compound as described in paragraph [0051] of JP9-78360A and in paragraph [0061] of JP9-324325A.

The metal catalyst source is in a liquid or gaseous state in the nozzle as a feedstock-supplying means, and in a gaseous form when thermally decomposed.

As the carbon source, there may be used any compound, which can form the vapor-phase growth carbon fibers, such as carbon nanofibers or carbon nanotubes. As the carbon source used herein, reference may be made to the organic compounds as described on page 2, left lower column, line 4 to right lower column, line 10 of JP60-54998B; in paragraph [0060] of JP9-324325A; and in paragraph [0050] of JP9-78360A. As the preferred carbon source, there may be made to an aromatic hydrocarbon such as benzene and toluene, aliphatic hydrocarbon such as hexane, propane, ethane, methane, etc., or an alicyclic hydrocarbon such as cyclohexane. The carbon source may be used singly, and a plurality of the sources in combination. Further, carbon monoxide may preferably be used as the carbon source to produce the vapor-phase growth carbon fibers, other than carbon nanofibers or nanotubes.

The proportions of the carbon source and the metal catalyst source charged into the vertical furnace of tubular reactor to the total charged gas amount are 0–40% for the former and 0.01–40% for the latter, preferably 0.5–10% for the former and 0.05–10% for the latter. The proportion "0%" of the carbon source means that the carbon source may not be needed when the metal catalyst source such as the organic metal compound contains an adequate amount of carbon to produce the carbon fibers. Therefore, in this invention, the metal catalyst sources and the carbon sources may be identical with each other.

When the carbon fibers glow in a radial direction of itself, they tend to contain a larger amount of pyrolytic carbon deposited. Therefore, in order to obtain the carbon fibers free of the pyrolytic carbon and containing a large amount of fine carbon fibers, such as carbon nanofibers or nanotubes, having a high degree of crystallinity, the carbon source may preferably be given in a smaller proportion and the metal catalyst source in a larger proportion.

As the carrier gas, there may conveniently be used a well known gas used for production of the vapor-phase growth carbon fibers. For example, it may preferably be hydrogen gas.

The vapor-phase growth carbon fibers can be made finer by using the carrier gas, organic metal compound and carbon source as described in JP60-54998B through the apparatus according to this invention.

The vertical furnace of tubular reactor is provided at the upper portion thereof with carrier gas-supplying nozzle 14 and feedstock-supplying nozzle 10 for supplying the metal catalyst source and the carbon source into the inside of the furnace of tubular reactor. Feedstock-supplying nozzle 10 in this invention is not limited in its structure as long as it can introduce the sources together with the carrier gas into the furnace of tubular reactor.

More detailedly, as shown in FIG. 1, feedstock-supplying nozzle 10 is provided around the outside circumference thereof with cooling jacket 12, into which is introduced a cooling gas at inlet 13 thereof. The cooling gas introduced is allowed to pass through cooling jacket 12 while being brought into contact with the outside surface of nozzle 10, and then leaves the cooling jacket at outlet 13A thereof. The carrier gas introduced through carrier gas-supplying nozzle 14 and allowed to pass through a zone between the inside surface of furnace of tubular reactor 11 and the outside surface of cooling jacket 12.

In the apparatus according to a preferred embodiment of this invention as mentioned above, a gas-flow rectifying means is provided for allowing the gases of the metal catalyst source and the carbon source to pass or flow downwardly in a piston flow state together with the carrier gas through the furnace of tubular reactor. This gas-flow rectifying means may be a first rectifying means as described in paragraph [0089] and a rectifying column in paragraphs [0092] and [0096] of JP9-324325A; and a feedstock gas-flow rectifying means as described in paragraph [0023], a first rectifying means in paragraph [0031], a second rectifying means in paragraph [0040] and a honeycomb plate in paragraph [0079] of JP9-78360A.

The vertical furnace of tubular reactor is heated therein by a heating means for thermally decomposing the catalytic metal and the carbon fibers to form the fine vapor-phase growth carbon fibers.

The heating means may be a heater capable of heating the inside of furnace of tubular reactor 11 to such a temperature that the metal catalyst source and the carbon source can adequately be decomposed. However, in fact, the inside of furnace of tubular reactor is hardly heated uniformly over the length from the top to bottom thereof, even if the reactor is covered over the length thereof with the heating means, because the specific area surface for radiation of heat of the furnace of tubular reactor at the ends thereof is greater than that at the center thereof.

In an example, vertical furnace of tubular reactor 11 is wound with electric heater 15 over the outside surface of the reactor between the two positions distant from the both the ends of the reactor, in other words, it normally has no electric heater wound at the given areas of the ends thereof. Further, electric heater 15 is often divided into a plurality of blocks. As a result, furnace of tubular reactor 11 has a reaction zone uniformly heated to the prescribed temperature over the given part thereof. The reaction zone is also called "uniformly heated zone". The zone below the uniformly heated zone, of which the temperature is gradually lowered downwardly, called "temperature-lowering zone". In this invention, the reaction zone is provided with discharge pipe 31, opening 31A of which is positioned to face end opening 18 of feedstock-supplying nozzle 10.

For the heating means attention should be paid to the following matters. In the apparatus for production of vapor-phase growth carbon fibers, the feedstock gases supplied through feedstock-supplying nozzle 10 are necessary to be decomposed in discharge pipe 31 to produce the vapor-phase growth carbon fibers. Therefore, a guide gas, which is sucked into discharge pipe 31 at opening 31A thereof, is desirably maintained at a high temperature but so as not to disturb the rectified stream of the feedstock gases supplied at feedstock-supplying nozzle 10 and the carrier gas supplied at the carrier gas-supplying nozzle. For this purpose, the guide gas rising up through the space between the inside surface of vertical furnace of tubular reactor 11 and the outside surface of discharge pipe 31, is desirably heated at a high temperature by allowing the furnace of tubular reactor to be heated by a heating means such as electric heater 15. However, it is undesirable to heat the guide gas to such a temperature that the density of the gas within discharge pipe 31 is lower than that of the gas present at the position above the discharge outlet of discharge pipe 31. Furnace of tubular reactor 11 is preferably heated to such a temperature that the guide gas can have a larger density than that of the gas present at the position above furnace of tubular reactor 11.

When the vapor-phase growth carbon fibers, i.e., carbon nanofibers or nanotubes are to be produced by the apparatus of this invention, the well known temperature used in producing fluid vapor-phase growth carbon fibers may be adopted as the temperature of the uniformly heated zone, more precisely the temperature within the discharge pipe present in the uniformly heated zone.

When the carbon nanofibers or nanotubes are desired, they may be produced at a relatively high reaction temperature of 900–1300° C., preferably 1000–1250° C., more preferably 1050–1200° C.

On the other hand, the reaction zone heated to a relatively low temperature of 400–700° C. has a tendency that the metal catalyst may be in a solid state and there may be produced a larger amount of carbon fibers having carbon lattice planes inclined to the fiber axis and conically arranged than that of carbon fibers having carbon lattice planes arranged in a wood growth ring-shaped form.

The smaller the particle size of the metal catalyst is, the lower the melting point of the metal catalyst. Therefore, the reaction temperature is not always limited to the above-mentioned ranges, but it may vary depending upon the diameter of the desired fibers and the kind of the metal catalyst source used.

As the reactor provided with the vertical furnace of tubular reactor, heating means and feedstock-supplying means reference may be made to the reactors as disclosed in the examples of JP9-78360A, JP9-229918A and JP9-324325A.

Discharging Means

The discharging means is provided with discharge pipe 31, which discharges the vapor-phase growth carbon fibers produced in the reactor together with the guide gas at the opening thereof to the outside of the furnace of tubular reactor.

An example of the discharging means provided with discharge pipe 31 is shown in FIG. 1. In FIG. 1, the upper part of discharge pipe 31 is inserted into vertical furnace of tubular reactor 11. The opening of discharge pipe 31 is positioned to face opening 18 of feedstock-supplying nozzle 10. The other end of discharge pipe 31 is connected to an exhausting means and collecting means.

Discharge pipe 31 as shown in FIG. 1 is positioned in furnace of tubular reactor 11 to in such a manner that the center line of feedstock-supplying nozzle can coincide with the center line of discharge pipe 31. In this example, the furnace of tubular reactor has one feedstock-supplying nozzle and one discharge pipe. However, a plurality of discharge pipes may be inserted into the furnace of tubular reactor for one feedstock-supplying nozzle. In this case, the openings of discharge pipes may preferably be positioned in proximity of one feedstock-supplying nozzle. On the other hand, the vertical furnace of tubular reactor may have a plurality of feedstock-supplying nozzles positioned at the upper portion thereof. In such a case, one discharge pipe is provided for each of the feedstock-supplying nozzles, in other words, the number of the discharge pipes is identical with that of the feedstock-supplying nozzles.

In FIG. 1, the position of opening 31A of discharge pipe 31 provided in proximity to opening 18 of feedstock-supplying nozzle 10 is determined in such a manner that the time for the feedstock gas to leave opening 18 and reach opening 31A 0.05–2 seconds, preferably 0.1–1 second, more preferably 0.2–0.5 second. Therefore, the position of opening 31A is determined according to the flow rate of the feedstock supplied from the feedstock-supplying nozzle. The thus determined position of opening 31A makes it possible to introduce the feedstock gas in a form enveloped completely with the guide gas rising up through the space between discharge pipe 31 and furnace of tubular reactor 11, into discharge pipe 31. The "form enveloped with the guide gas", very briefly speaking, means that the feedstock gas exists in the center area of discharge pipe 31, the carrier gas exists around the feedstock gas, and the guide gas exists around the carrier gas.

The shape of discharge pipe 31 on the cross section thereof rectangular to the central axis of the pipe is preferably identical with that of furnace of tubular reactor 11 on the cross section rectangular to the central axis of the reactor. Normally, furnace of tubular reactor 11 is a circular pipe and, therefore, discharge pipe 31 is also a circular pipe.

When the diameter of discharge pipe 31 is unchanged between opening 31A and the rear end thereof, i.e., discharge pipe 31 is a straight pipe, the inner diameter of opening 31A of discharge pipe 31 is 1.3–10 times, preferably 1.5–8 times, more preferably 1.7–6 times larger than the inner diameter of feedstock-supplying nozzle 10. When the inner diameter of opening 31A is within the above-mentioned range, an undisturbed stream of the feedstock gas and carrier gas supplied at the upper portion of discharge pipe 31 is allowed to pass through the discharge pipe, while being enveloped with the guide gas, which gives an advantage that the deposition of fibrous products on the inside surface of furnace of tubular reactor 11 is prevented.

Discharge pipe 31A is not limited to the straight pipe, but may be a pipe having different diameters between the opening and the other parts thereof.

In this case, the inner diameter of the parts other than the opening of the pipe is 1.1–10 times, preferably 1.3–8 times, more preferably 1.5–6 times larger than the inner diameter of the feedstock-supplying nozzle. The discharge pipe having the above-mentioned inner diameter gives a good linear velocity of gas flow, which does not disturb the stream in discharge pipe 31.

Figure 4:
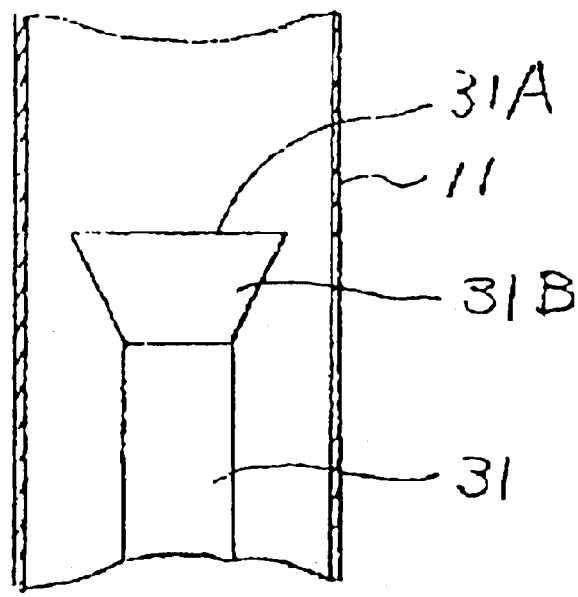
FIG. 4 is a schematical view of a discharge pipe according to one embodiment of this invention.
Figure 5:
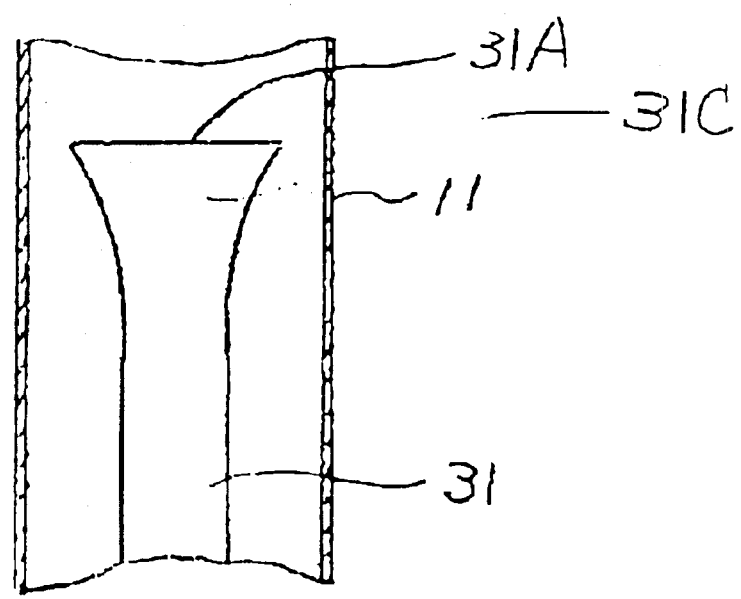
FIG. 5 is a schematical view of a discharge pipe according to another embodiment of this invention.
Figure 6:
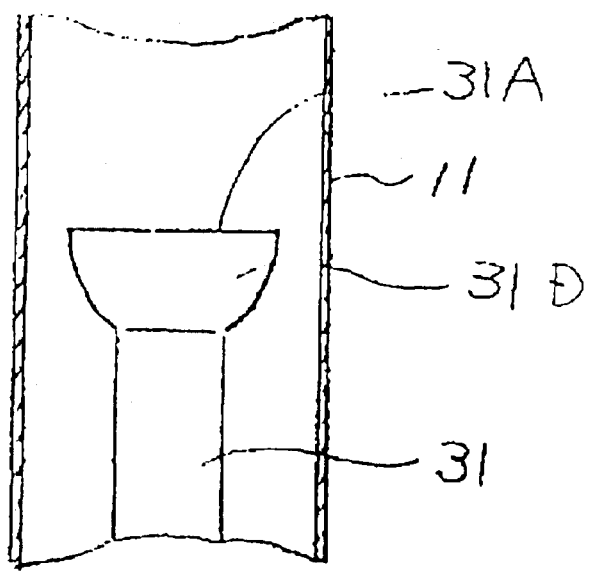
FIG. 6 is a schematical view of a discharge pipe according to a further embodiment of this invention

In order to efficiently suck the feedstock gas supplied by feedstock-supplying nozzle 10 and the vapor-phase growth carbon fibers produced from part of the feedstock gas from opening 18 into discharge pipe 31, the shape of discharge pipe 31A is desirably such that the discharge pipe is extended outwardly to have a larger diameter at opening 31A than at the central part of the discharge pipe, which is also called "straight part", i.e., discharge pipe 31 has a funnel-like shape at opening 31A. In other words, the "funnel-like shape" means that the inner diameter of opening 31A is larger than that of the central part of discharge pipe 31. For example, opening 31B as shown in FIG. 4 has a conical shape, and opening 31C as shown in FIG. 5 has a trumpet-like shape. In other words, the line from the edge of the opening to the top end of the central part of discharge pipe may be straight (conical in cross section) or curved. This funnel-like part is called a "reducer".

In the case where the line from the edge of opening 31A to the central part of discharge pipe 31 is curved, the preferred shape is known in the reducing nozzle of a wind tunnel. That is, this shape is such that the flow from the broader upstream place is reduced at the downstream place, at which the flow can be made constant in the flow rate in the cross section of discharge pipe 31, and parallel and uniform, and hardly disturbed. For example, see Ryouji Kobayashi, "Design of Reducing Nozzle of Wind Tunnel", in Report of Institute of High Speed Mechanics (now Fluid Science), Tohoku University, 1981, Vol. 46, No. 400, pp. 17–37, of which the curved shape is shown as R/D1 in FIGS. 2, 3, 4 and 9. Furthermore, the shape of a reducer used for connecting a gas pipe having a larger diameter with a gas pipe having a smaller diameter is also preferred, because it can smoothly change the gas flow rate.

Since discharge pipe 31 inserted in furnace of tubular reactor 11 is heated to the temperature of the reacting zone, the material from which the pipe is made must be resistant to the high temperature brittle fracture by hydrogen and carburization, when hydrogen gas is used as the carrier gas, may preferably be a ceramics such as silicon carbide, silicon nitride, alumina, mullite, etc.

The discharging means is provided with an exhausting means for exhausting the gas in the discharge pipe, and a collecting means for collecting the fine vapor-phase growth carbon fibers sucked into the discharge pipe.

The exhausting means is designed in such a manner that a stream for sucking and transferring the fine vapor-phase growth carbon fibers together with the guide gas can be formed. For example, a fan or ejector 33 may be provided in discharge pipe 31 at the position thereof adequately distant from opening 31A or the outlet of discharge pipe 31, or the position slightly distant from the outlet of discharge pipe 31.

Ejector 33 is provided in such a manner that a flow of a gas is introduced at a high speed from the outside toward the stream from discharge pipe 31, and acts as a high-speed gas flow for transferring the stream of discharge pipe 31 at a high speed. In other words, the ejector is designed to form a reduced pressure, e.g., 0 to −100 mmH$_2$O, preferably −1 to −50 mmH$_2$O, more preferably −3 to −30 mmH$_2$O at the junction wherein the high-speed gas flow meets the stream from the discharge pipe. For example, as shown in FIG. 1, ejector 33 comprises a main body, high-speed gas-introducing pipe 32 and a discharging conduit. The bottom end of discharge pipe 31 is inserted into the inside of the main body of ejector 33 in such a manner that the discharging conduit faces the bottom end opening of discharge pipe 31 in a coaxial fashion. The inner diameter of discharge pipe 31, flow rate of the high-speed gas flow from gas-introducing pipe 32, and inner diameter of the discharging conduit are designed to give the above-mentioned ranges of pressure. In the actual operation of the apparatus, the stream leaving discharge pipe 31 contains the produced fibers and, hence, the pressure of the flow is hardly determined at the junction of the stream and the high-speed gas flow. Therefore, the relationship between the pressure at the junction when no amount of the feedstock gas is introduced and the pressure of the guide gas uniform supply vessel is beforehand checked, and then the pressure of the guide gas uniform supply vessel is substituted for the pressure at the junction.

In the case where the exhausting means is an ejector, the collecting means may be downstream of the ejector.

However, in the case where the exhausting means is a fan, the collecting means is preferably upstream of the exhausting means with respect to the maintenance of the collecting means. The collecting means can collect fine vapor-phase growth carbon fibers, and may be of various known types, for example, a collecting means can collect fine vapor-phase growth carbon fibers, and may be of various known types, for example, a collector of a dry type, such as an electrostatic precipitator, bag filter and cyclone, or of a wet type spraying water or an organic liquid onto the carbon fibers.

Guide Gas-Supplying Means

Guide gas-supplying means 40 of this invention is designed to allow the guide gas to pass in a form like a piston flow on the outside surface of the discharge pipe 31 upwardly from the end of discharge pipe 31 to opening 31A without forming any turbulent flow such as a spiral flow, thereby supplying the guide gas uniformly around the circumference of opening 31A. Guide gas-supplying means 40 is equipped with flow-regulating means 43 for regulating the guide gas to flow substantially in parallel to the central axis of discharge pipe 31 and at a constant flow rate on any cross section rectangular to the central axis, and guide gas uniform supply vessel 41 for storing the guide gas.

An example of guide gas-supplying means 40 is combined with discharge pipe 31 in vertical furnace of tubular reactor 11, as shown in FIG. 1. In other words, this gas-supplying means is provided with guide gas uniform supply vessel 41, guide gas supply pipe 42 for introducing the guide gas into the guide gas uniform supply vessel, and a part 43 for rectifying and regulating the flow of the guide gas.

Guide gas uniform supply vessel 41 may be of a circular or rectangular shape on a cross section rectangular to the central axis of discharge pipe 31. In the case where guide gas uniform supply vessel 41 is of a cylindrical shape, the inner diameter thereof may be within the range of 1.1–4 times, preferably 1.3–3 times, more preferably 1.5–2.5 times the inner diameter of furnace of tubular reactor 11. The inner diameter of the guide gas uniform supply vessel within these ranges does not allow such an excess of the guide gas to be supplied to opening 31A of discharge pipe 31 that no turbulence occurs in furnace of tubular reactor 11. Thus, the guide gas can uniformly be supplied over the entire circumference of opening 31A.

In order to uniformly supply the guide gas over the entire circumference of opening 31A, the flow rate of the guide gas may be within the range of 0.1–10 times, preferably 0.3–5 times, more preferably 0.5–3 times the total amount of the feedstock gas and the carrier gas flowing down from the upper portion of furnace of tubular reactor.

The optimum amounts of the guide gas and the gases flowing down through furnace of tubular reactor 11 vary depending upon some or all of the inner diameter of furnace of tubular reactor 11, diameter of discharge pipe 31 and diameter of opening 31A. Comprehensively, the linear speed of the guide gas passing upwardly through the space between the outside surface of discharge pipe 31 and the inside surface of furnace of tubular reactor 11 may be within the range 0.1–10 times, preferably 0.3–5 times, more preferably 0.5–3 times the linear speed of the gas stream passing downwardly through furnace of tubular reactor 11. These ranges do not produce any turbulence of the gas stream, allow the gas stream to overflow at opening 31A, and prevent the deposition of the fibers on the inside surface of furnace of tubular reactor 11.

Gas flow regulating part 43 acts as a regulator for changing a rising guide gas containing swirling flows generated therein in gas uniform supply vessel 41 into a stream parallel to the axis of discharge pipe 31 at opening 31A thereof. In addition, it may be provided with a function of making swirling flows in the guide gas, which extinguish the swirling flows generated in a reaction gas flow between feedstock-supplying nozzle 10 and opening 31A.

Figure 7:
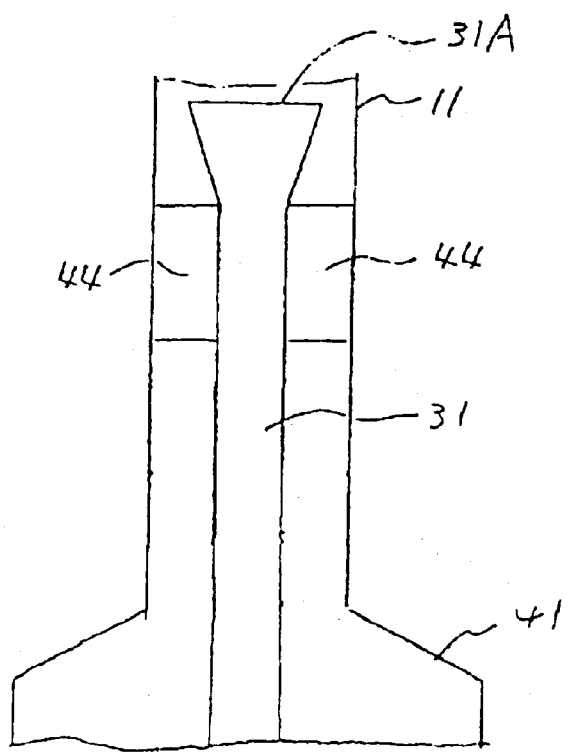
FIG. 7 is a schematical view of a rectifying plate according to one embodiment of this invention.
Figure 8:
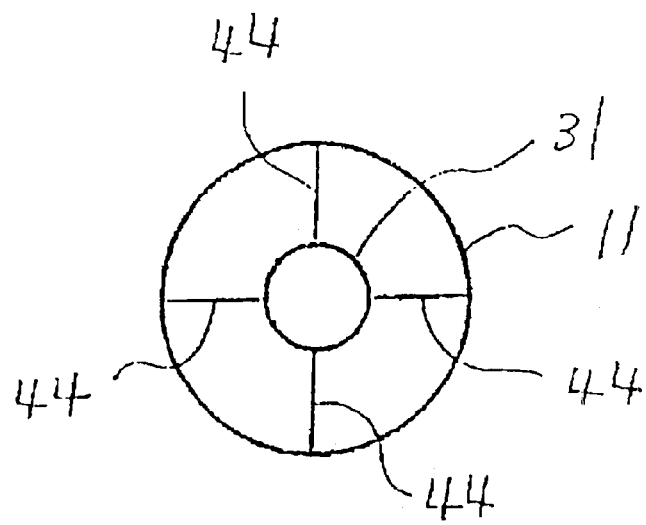
FIG. 8 is a schematical view of a rectifying plate according to another embodiment of this invention.

In the case where opening 31A is inserted into furnace of tubular reactor 11, the space formed by the inside surface of furnace of tubular reactor 11 and the outside surface of discharge pipe 31 may be flow regulating part 43. In order to secure the rising stream uniform at any plane rectangular to the axis of discharge pipe 31, rectifiers 44 may be provided in the space formed by the inside surface of furnace of tubular reactor 11 and the outside surface of discharge pipe 31, as shown in FIGS. 7 and 8. This rectifier may extend in a radial direction from the axis of discharge pipe 31 to the inside surface of furnace of tubular reactor 11, as shown in FIG. 8.

Figure 9:
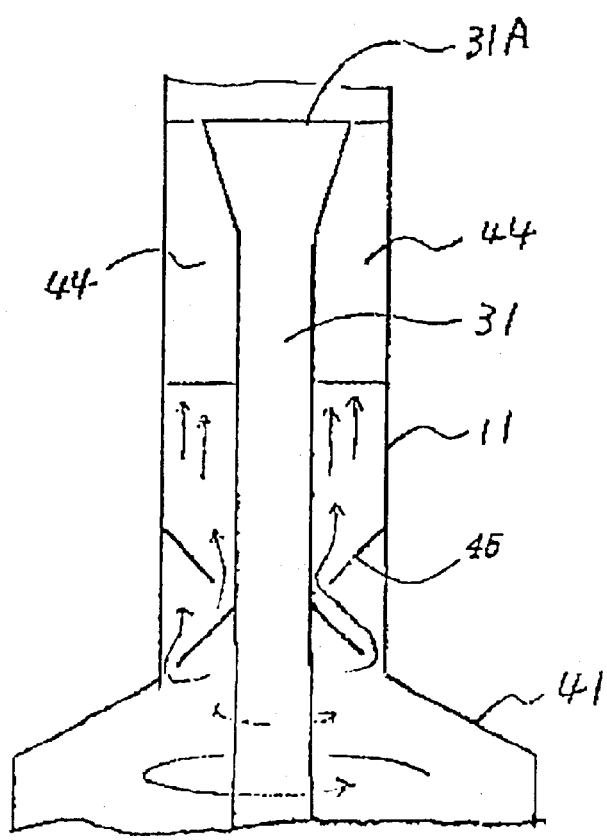
FIG. 9 is a schematical view of a rectifying plate according to a further embodiment of this invention.

Normally, the number of rectifiers 44 provided is from 2 to 8. The positions of rectifiers 44 are not limited, as far as they can achieve the function as mentioned above. For example, as shown in FIG. 7, rectifiers 44 may be provided in such a manner that the upper and lower ends of the rectifiers are positioned in the intermediate part of discharge pipe 31. Furthermore, as shown in FIG. 9, rectifiers 44 may be provided in such a manner that the upper ends of the rectifiers coincide with the level of opening 31A. The length of rectifiers 44 is not limited, as far as it is designed to form the rising stream flowing substantially at the same flow rate on any plane rectangular to the axis of discharge pipe 31.

Furthermore, as shown in FIG. 9, baffle plates 45 may be provided below rectifiers 44, so as not to introduce swirling flows of the guide gas generated in gas uniform supply vessel 41 into the flow-regulating part. These baffle plates may be formed by a combination of a ring-like plate mounted on the inside surface of furnace reactor 11 and a ring-like plate mounted on the outside of discharge pipe 31, both the plates being inclined downwardly, as shown in FIG. 9.

The guide gas used in this invention is not limited, as far as the objects of this invention can be achieved. However, the guide gas is desirably inert in the reactor. As such an inert gas reference may be made to a rare gas such as argon gas, or nitrogen gas. The great difference in the molecular weight between the guide gas and the carrier gas allow the guide gas not to be mixed with the feedstock gas and the carrier gas, thus completely enveloping these gases. As a result, such a condition that no carbon fibers are formed on the inside surface of discharge pipe 31 can be realized. This condition can more easily be obtained by using hydrogen gas as the carrier gas and nitrogen gas as the guide gas. It is preferred that the composition of the guide gas is identical with or more close to that of the carrier gas, with respect to recovery and reuse of these gases.

Device for Preventing Formation of Fine Vapor-phase Growth Carbon Fibers

An example of the device for preventing formation of vapor-phase growth carbon fibers according to this invention is a combination of the discharging means and the guide gas-supplying means.

Operation of Apparatus for Production of Vapor-phase Growth Carbon Fibers

The apparatus for production of vapor-phase growth carbon fibers is operated in such a manner as mentioned below. The introduction of the guide gas through guide gas supply pipe 42 in gas uniform supply vessel 41, as shown in FIG. 1, may normally cause the formation of the swirling flow in gas uniform supply vessel 41 around discharge pipe 31, although the degree of the formation varies depending upon the capacity of the vessel.

On the other hand, the gas contained in discharge pipe 31 is discharged through the bottom opening of discharge pipe 31 into ejector 33. Therefore, the gas is sucked into discharge pipe 31 from the outside to the inside thereof, through opening 31A.

Since the gas is sucked into discharge pipe 31, the guide gas contained in the gas uniform supply vessel rises upwardly. The swirling flows generated in gas uniform supply vessel 41 are extinguished by flow-regulating part 43, thereby making the rising stream parallel to the axis of discharge pipe 31.

On the other hand, vertical furnace of tubular reactor 11 is heated with electric heater 15. In this case, a reaction zone is formed in the central part of furnace of tubular reactor 11 when heated, and uniformly maintained at a high temperature with heater 15. The temperatures of the upper and lower parts of discharge pipe 31 are reduced. The carbon source gas and the metal catalyst source gas are supplied to furnace of tubular reactor 11 together with the carrier gas through feedstock-supplying nozzle 10 provided above furnace of tubular reactor 11.

Feedstock-supplying nozzle 10 is positioned to face the reaction zone. Opening 31A of discharge pipe 31 is positioned to face feedstock-supplying nozzle 10. Therefore, the carbon source gas and the metal catalyst source leaving opening 31A are drawn into discharge pipe 31 at opening 31A, with the guide gas rising through the space between the outside surface of discharge pipe 31 and the inside surface of furnace of tubular reactor 11.

The inside of the part of discharge pipe 31 positioned in the reaction zone of furnace of tubular reactor 11 is heated to a temperature equal to that of the reaction zone by the radiation from the reaction zone and the heated guide gas.

The feedstock gas drawn into discharge pipe 31 at opening 31A is immediately decomposed to produce fine vapor-phase growth carbon fibers on nuclei of the catalyst metal in the reaction zone of discharge pipe 31.

That is, the feedstock gas cooled by a cooling gas and injected into furnace of tubular reactor 11 is rapidly heated is discharge pipe 31 to the reaction temperature, because opening 31A of discharge pipe 31 is positioned to closely face opening 18 of feedstock-supplying nozzle 10, thus efficiently producing the vapor-phase growth carbon fibers in discharge pipe 31.

On the other hand, the carrier gas falls downwardly in a ring-like form from carrier gas-supplying nozzle 14 along the inside surface of furnace of tubular reactor 11. The carrier gas is drawn together with the feedstock gas and the metal catalyst source into discharge pipe 31. When using the guide gas different in the kind from the carrier gas, e.g., using hydrogen gas as the carrier gas and nitrogen gas as the guide gas, the feedstock gas is enveloped with the carrier gas, and further enveloped with the guide gas. These gases in this condition appear to be sucked into discharge pipe 31. Although the carrier gas and guide gas sucked into discharge pipe 31 at opening 31A are finally blended with each other during passing therethrough, the stream in the condition as mentioned above appears to be maintained at least in the reaction zone of discharge pipe 31 maintained at the prescribed temperature. In other words, it appears that the carrier gas and guide gas are not blended with each other at least in the reaction zone, i.e., the carrier gas separates the feedstock gas from the guide gas. This does not allow the feedstock gas and the produced vapor-phase growth carbon fibers to contact the inside surface of discharge pipe 31.

Thus, no carbon fibers are advantageously deposited on the inside surface at discharge pipe 31.

The fine vapor-phase growth carbon fibers produced in the reaction zone of discharge pipe 31 are gathered in the center of discharge pipe 31, transferred together with the guide gas through discharge pipe 31, and finally collected in the collecting means.

The fine vapor-phase growth carbon fibers do almost not grow toward radial direction of itself, and are discharged to the outside of furnace of tubular reactor 11. Therefore, the collected carbon fibers are very fine products such as carbon nanotubes or carbon nanofibers.

The products are hardly classified in the carbon nanotubes and the carbon nanofibers with respect to the diameter thereof. For example, the products of 1–10 nm, or alternatively 1–1.5 nm in diameter may be called carbon nanotubes. The products of 10–100 nm in diameter, or alternatively 15 nm-several hundreds of nanometer may be called carbon nanofibers.

In any event, the vapor-phase growth carbon fibers of this invention are very fine carbon fibers produced by a vapor phase depositing method, and preferably of 100 nm and below, more preferably 50 nm and below in diameter. Each of these fibers has a hollow core part along the axis of the fiber. One or more graphite network layers are formed around the hollow core part and parallel to each other and to the axis of the fiber in such a manner that the cross-sectional appearance of the fiber is like growth ring of wood. Further, these fibers have a lattice distance $d_{002}$ of 0.336–0.360 nm. Therefore, the vapor-phase growth carbon fibers include so-called carbon nanotubes and nanofibers.

In another example of the apparatus for production of vapor-phase growth carbon fibers according to this invention, the metal catalyst source and carbon source are supplied to the vertical furnace of tubular reactor at the upper portion thereof, decomposed and reacted in the reaction zone of the furnace of tubular reactor to produce carbon fibers, metal catalysts and unreacted part of the carbon source, which are sucked together with the guide gas supplied through the guide gas-supplying means into the discharge pipe at the opening thereof before the produced carbon fibers are deposited on the inside surface of the reaction zone, thereby preventing deposition of the carbon fibers on the inside surface of the furnace of tubular reactor and blocking the pipe.

Figure 2:
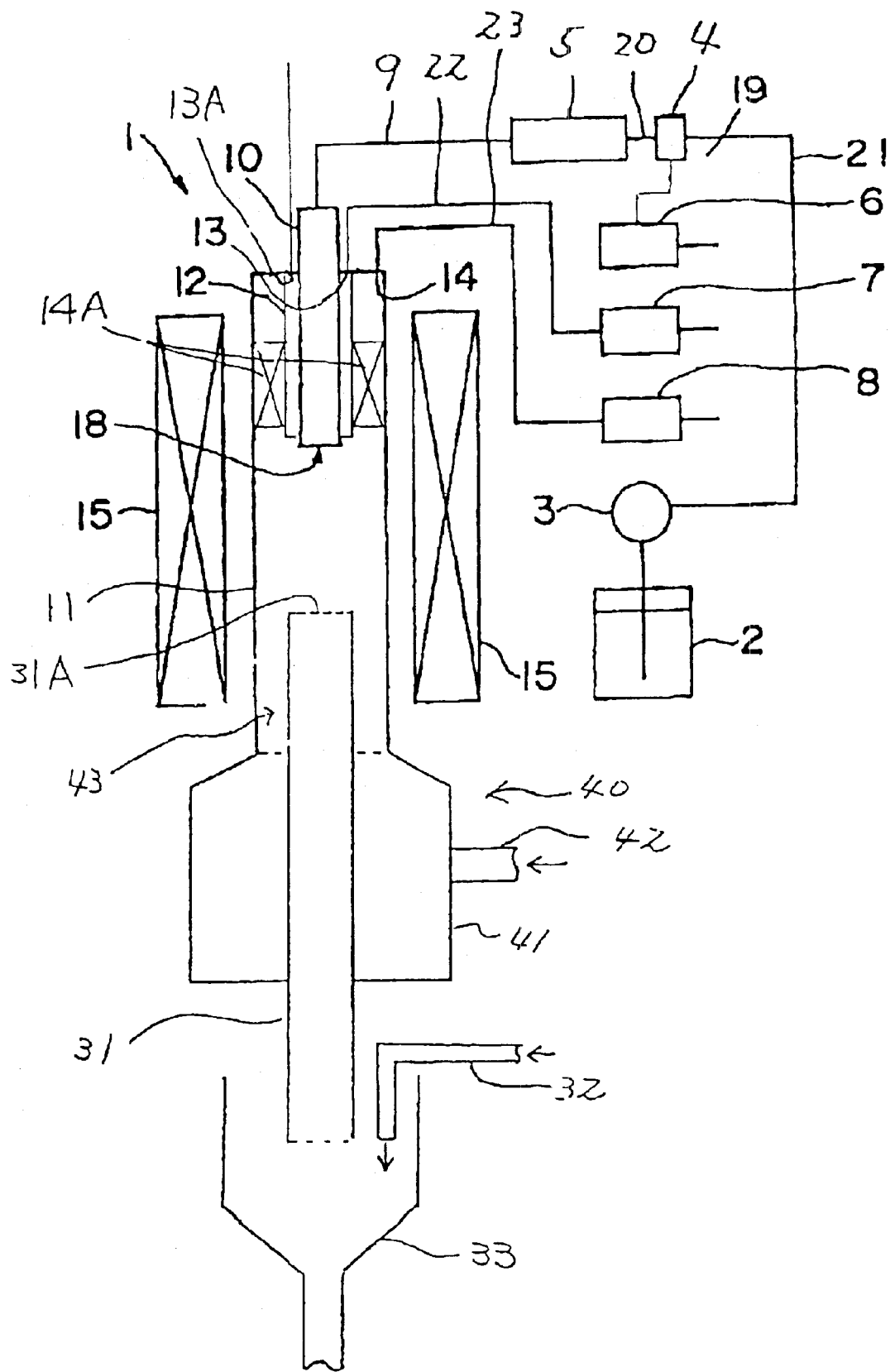
FIG. 2 is a schematical view of another embodiment of this invention.

This example is shown in FIG. 2. This invention is not limited to this example shown in FIG. 2.

The reference numbers used in FIG. 2 are the same numbers as in FIG. 1.

Vertical Reacting Means

The vertical reacting means capable of exhibiting the function as mentioned above may have the same cross-sectional shape in a longitudinal direction, for example, may have a furnace of tubular reactor of a cylindrical or rectangular column form.

The vertical furnace of tubular reactor 11 has a function of thermally decomposing a metal catalyst source and carbon source gas supplied together with a carrier gas to produce carbon fibrous materials and allowing the materials to grow up.

In this example, can be used the same metal catalyst source, cocatalyst and carbon source gas as mentioned in the example as shown in FIG. 1. Furthermore, the proportions of the carbon source gas and the metal catalyst source of the total mix gas are preferably as already mentioned above.

If the carbon fibrous materials grow up radially when produced, they contain a larger amount of pyrolytic carbon.

In order to obtain fine vapor phase carbon fibers free of the pyrolytic carbon and having a high degree of graphitization, or carbon nanofibers and/or nanotubes having a diameter of smaller than that of the vapor-phase growth carbon fibers, the proportion of the carbon source may preferably be rendered smaller, and the proportion of the metal catalyst source larger.

In this example, can be used the same known carrier gas as mentioned in the preceding example.

In this example, can be used the same carrier gas-supplying nozzle, feedstock-supplying nozzle and cooling jacket as used in the preceding example.

In this example, can be used the same known gas-flow rectifying means as used in the preceding example.

In this example, the vertical furnace of tubular reactor is heated in the inside thereof for thermally decomposing and reacting the carbon source and the metal catalyst source, particularly an organic metal compound to produce the carbon fibers in the same heating manner as mentioned in the preceding example.

When vapor-phase growth carbon fibers and carbon nanofibers or nanotubes having a smaller diameter than that of the vapor-phase growth carbon fibers are to be produced according to the apparatus of this invention, the known temperatures normally used in production of the vapor-phase growth carbon fibers can be used in the reaction zone uniformly heated.

Of the carbon fibers, the carbon nanofibers and/or nanotubes have such a tendency that they can more easily be produced when the particles of the metal catalyst formed by decomposition of the metal catalyst source are in a liquid droplet form. When the particles of the metal catalyst are in a solid state, production of fish bone-shaped or conically laminated carbon fibrous materials has been observed.

Since the metal solid particles having a smaller particle size have a lower melting point, the heating temperature used varies depending upon the particle size of the formed metal solid particles. Since the range of higher temperatures than the melting point varying depending upon the kind of the metal catalyst source and the diameter of the carbon fibrous materials to be produced is to be decided, one heating temperature cannot be chosen. In many cases, however, the temperature of heating the reaction zone is within the range of 900–1300° C., preferably 1000–1200° C. Furthermore, a much larger difference between the decomposing temperature of the carbon source and the heating temperature causes deposition and lamination of the pyrolytic carbon on the surface of the carbon fibrous materials, to produce carbon fibrous materials having a greater diameter. Particularly, in order to obtain carbon nanofibers and/or nanotubes having a smaller diameter, for example, smaller than 10 nm, the heating temperature used is preferably 300–500° C. higher than the decomposing temperature of the carbon source. In short, the heating temperature is adequate to produce carbon when the carbon source and the metal catalyst are brought into contact with each other.

Generally speaking, as mentioned above, the produced carbon materials have a fish bone-shaped structure (i.e., a structure of carbon lattice planes being conically laminated, which seems like a fish bone in a cross section rectangular to the fiber axis) or a ribbon shaped structure having carbon lattice planes laminated in a right angle to the fiber axis.

As the reactor equipped with the vertical furnace of tubular reactor and the feedstock-supplying means, the reactors in the examples disclosed in JP978360A, JP9-229918A and JP9-324325A.

Discharging Means

This discharging means is equipped with a discharge pipe for taking the carbon fibrous materials produced in the reaction zone of the vertical furnace of tubular reactor together with the discharge and guide gases, into the discharge pipe at the opening thereof and discharging them out of the furnace of tubular reactor.

An example of the discharging means equipped with the discharge pipe is shown in FIG. 2. In FIG. 2, the upper portion of discharge pipe 31 is inserted in furnace of tubular reactor 11, and the position of the discharge pipe is determined in such a manner that the opening of discharge pipe 31 is near the reaction zone of furnace of tubular reactor 11.

Figure 3:
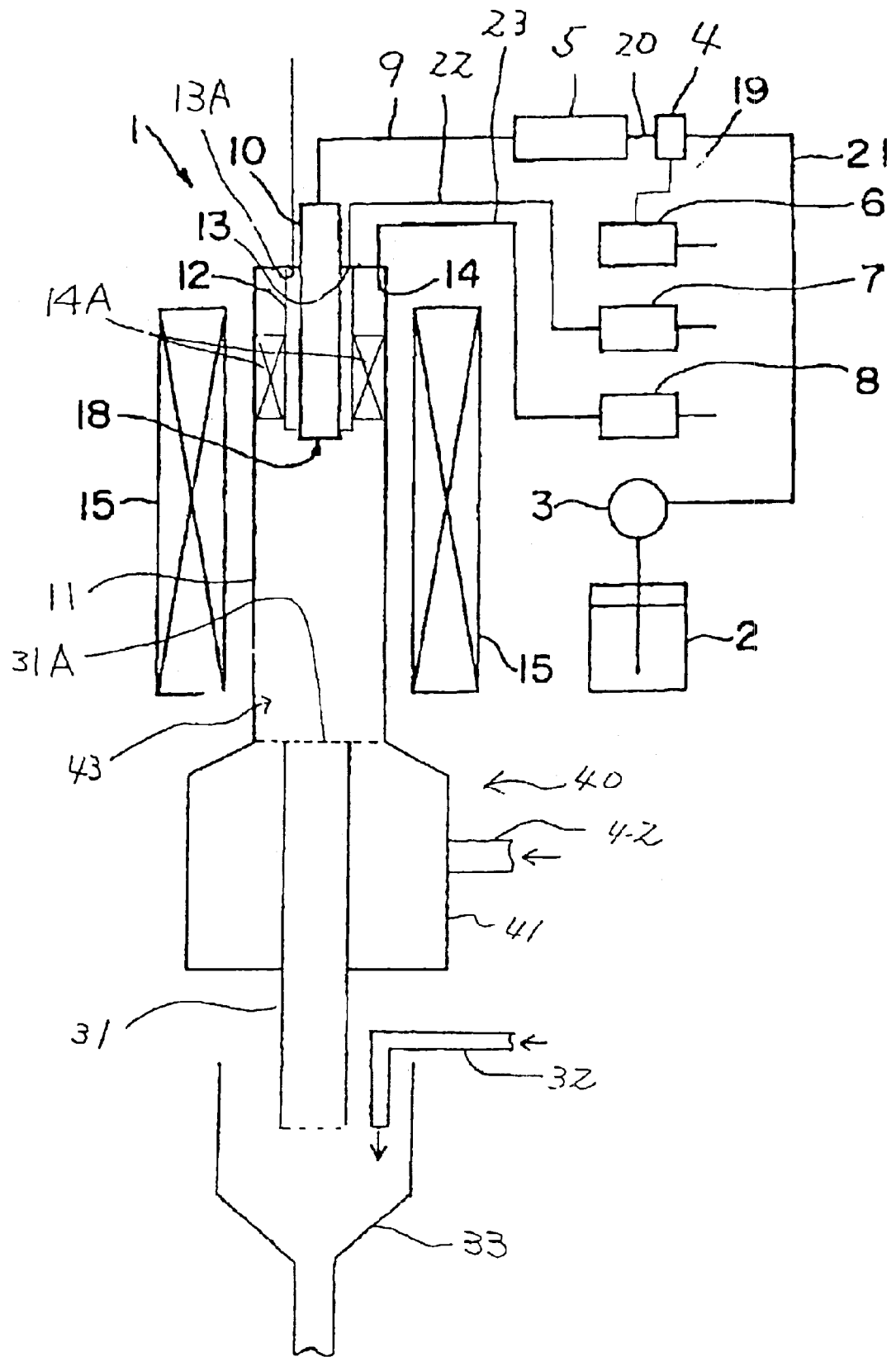
FIG. 3 is a schematical view of a further embodiment of this invention.

The position of the opening is not limited, as far as the discharge pipe can suck the carbon fibers produced in the reaction zone of the vertical furnace of tubular reactor into the discharge pipe at the opening thereof, before the carbon fibers are deposited on the inside surface of the discharge pipe. For example, (1) discharge pipe 31 may be positioned in such a manner that upper opening 31A of discharge pipe 31 can face the lower end of furnace of tubular reactor 11, as shown in FIG. 3, (2) discharge pipe 31 may be positioned in such a manner that the upper opening of discharge pipe 31 can be in a proper position of a temperature-reduced zone, at which the carbon fibrous materials such as carbon nanofibers and/or nanotubes produced in the reaction zone does not reach the wall of the discharge pipe, but can be taken into the discharge pipe, or (3) discharge pipe 31 is inserted into furnace of tubular reactor and positioned in such a manner that upper opening 31A of discharge 31 can be positioned to face the reaction zone. In the case where the discharge pipe is positioned in such a manner that the upper opening can be positioned in the temperature-reduced zone, the temperature of this zone may be 200° C., preferably 100° C. lower than the uniform temperature.

(3) above is preferred for the position of discharge pipe 31, because the possibility of the feedstock gas reaching the inside surface of furnace of tubular reactor 11 is lowered.

Discharge pipe 31 is preferably positioned in such a manner that the axis of discharge pipe 31 can coincide with the axis of furnace of tubular reactor 11. Furthermore, the shape of discharge pipe 31 in the cross section rectangular to the axis thereof is preferably identical with that of furnace of tubular reactor 11 in the cross section rectangular to the axis thereof. Normally, both furnace of tubular reactor 11 and discharge pipe 31 are round pipes.

In this case, the part of pipe other than the upper opening of discharge pipe 31 inserted in furnace of tubular reactor 11 has an inner diameter of one tenth (1/10) to three fourth (3/4), preferably one eighth (1/8) to two third (2/3), most preferably one fourth (1/4) to one second (1/2), of that of furnace of tubular reactor 11, because these ratios for discharge pipe 31 make the linear speed of the stream of the inside surface of furnace of tubular reactor 11 proper to generate no turbulence in furnace of tubular reactor 11.

The upper opening of discharge pipe 31 may preferably be of a known shape, such as a funnel-like, wind tunnel reducing nozzle-like, or reducer-like shape, as mentioned above.

The outer diameter of the end opening of discharge pipe 31 is decided with respect to the above-mentioned relationship between the inner diameter of the part of pipe and the inner diameter of furnace of tubular reactor 11, further the above-mentioned relationship between the inner diameter at the edge of the opening and the inner diameter of the straight pipe part of the discharge pipe, and the thickness at the edge of the opening of the discharge pipe. The thickness is normally about 1–10 mm. However, in the case where the thickness is specially large, the edge of the opening is of a special shape, or a plurality of discharge pipes are provided in the furnace of tubular reactor, the distance between the outside at the edge of the opening of discharge pipe 31 and the inside surface of furnace of tubular reactor 11 is preferably at least 5 mm in order to obtain a space allowing the guide gas to flow.

This discharging means is provided with an exhausting means for discharging the gas from discharge pipe 31, and preferably connected to a collecting means for collecting the carbon fibrous materials sucked into discharge pipe 31.

The exhausting means and colleting means may be the same as mentioned in the preceding examples.

Guide Gas-Supplying Means

The same guide gas-supplying means as mentioned in the preceding examples may be used herein.

An example of the guide gas-supplying means 40 is, as shown in FIG. 2, provided with guide gas uniform supply vessel 41, guide gas supply pipe 42 for introducing the guide gas into guide gas uniform supply vessel 41, and gas flow-regulating means 43 for guiding the guide gas to upper opening 31A of discharge pipe 31 while rectifying the gas within gas uniform supply vessel 41.

Gas flow regulating part 43 acts as a regulator for changing a rising guide gas containing swirling flows generated therein in gas uniform supply vessel 41 into a stream parallel to the axis of discharge pipe 31 at opening 31A thereof. In addition, it may be provided with a function of making swirling flows in the guide gas, which extinguish the swirling flows generated in a reaction gas flow between feedstock-supplying nozzle 10 and opening 31A.

When the capacity of guide gas uniform supply vessel 41 is enough, and the opening of guide gas supply pipe 42 in guide gas uniform supply vessel 41 is adequately distant from the gas flow regulating part, for example, near the bottom of guide gas uniform supply vessel 41, and further, opening 31A is positioned near the lower opening of the furnace of tubular reactor, as shown in FIG. 3, the upper portion of guide gas uniform supply vessel 41 functions as gas flow regulating part 43.

In this guide gas supplying means, can be used rectifiers 44 and baffle plates 45 as used in the preceding example. As the guide gas, can be used the same gas as used in the preceding example.

Device for Preventing Deposition of Carbon Fibrous Materials

The combination of the discharging means and the guide gas supplying means in the apparatus for production of carbon fibrous materials is the device for preventing deposition of carbon fibrous materials according to this invention.

Operation of Apparatus for Production of Carbon Fibrous Materials

The apparatus for production of carbon fibrous materials according to this invention is operated in the following manner. The introduction of the guide gas through guide gas supply pipe 42 in gas uniform supply vessel 41, as shown in FIG. 2, may normally cause the formation of the swirling flow in gas uniform supply vessel 41 around discharge pipe 31, although the degree of the formation varies depending upon the capacity of the vessel.

On the other hand, the gas contained in discharge pipe 31 is discharged through the bottom opening of discharge pipe 31 into ejector 33. Therefore, the gas is sucked into discharge pipe 31 from the outside to the inside thereof, through opening 31A.

Since the gas is sucked into discharge pipe 31, the guide gas contained in the gas uniform supply vessel rises upwardly. The swirling flows generated in gas uniform supply vessel 41 are extinguished by flow-regulating part 43, thereby making the rising stream parallel to the axis of discharge pipe 31.

On the other hand, vertical furnace of tubular reactor 11 is heated with electric heater 15. In this case, a reaction zone is formed in the central part of furnace of tubular reactor 11 when heated, and uniformly maintained at a high temperature with heater 15. The temperatures of the upper and lower parts of discharge pipe 31 are reduced. The carbon source gas and the metal catalyst source gas are supplied to furnace of tubular reactor 11 together with the carrier gas through feedstock-supplying nozzle 10 provided above furnace of tubular reactor 11. Feedstock-supplying nozzle 10 is positioned to face the reaction zone. Opening 31A of discharge pipe 31 is positioned to face feedstock-supplying nozzle 10. Therefore, the carbon source gas and the metal catalyst source gas leaving opening 31A are immediately decomposed in the reaction zone to form carbon fibrous materials on nuclei of the metal catalyst. The carrier gas falls down in a ring-like form along the inside surface of furnace of tubular reactor from cooling gas-supplying nozzle 13 and carrier gas-supplying nozzle 14. Therefore, the carbon fibrous materials produced in the reaction zone is prevented by the carrier gas from depositing on the surface of the pipe.

The carbon fibrous materials produced in the reaction zone fall down, and are sucked together with the guide gas into discharge pipe 31 near upper opening 31A. The sucked carbon fibrous materials are gathered to the axis of discharge pipe 31, transferred with the guide gas and finally collected in the collecting means.

The carbon fibrous materials produced in the reaction zone may grow up radially under some conditions, before they reach upper opening 31A of discharge pipe 31. However, upper opening 31A faces the zone uniform in temperature, called the reaction zone, and the carbon fibrous materials do not grow up radially, and sucked in the discharge pipe at upper opening 31A thereof. That is, the carbon fibrous materials are collected as carbon nanofibers or nanotubes. Even if the upper opening is not positioned in the reaction zone, the carrier gas flowing at a high speed does not afford the time sufficient for the radial growth of the carbon fibrous materials, so that the carbon fibrous materials can be sucked into discharge pipe 31 at upper opening 31A as carbon nanofibers or nanotubes, and collected.

If the carbon fibrous materials produced in the reaction zone grow up radially before they are sucked into discharge pipe 31 at upper opening 31A, the collected products are vapor-phase growth carbon fibers other than the carbon nanofibers or nanotubes.

The vapor-phase growth carbon fibers of this invention are very fine carbon fibers produced by a vapor phase depositing method, and preferably of smaller than about 100 nm, more preferably smaller than 50 nm in diameter. Each of these fibers has a hollow core part along the axis of the fiber. One or more graphite network layers are formed around the hollow core part and parallel to each other and to the axis of the fiber in such a manner that the cross-sectional appearance of the fiber is like growth ring of wood. Further, these fibers have a lattice distance $d_{002}$ of 0.336–0.360 nm. Therefore, the vapor-phase growth carbon fibers include so-called carbon nanotubes and nanofibers.

This invention will be illustrated below with reference to the drawings.

EXAMPLE 1

Carbon nanofibers were produced with the apparatus for production of carbon fibrous materials, as shown in FIG. 2, under the following conditions.

(1) Vertical Furnace of tubular reactor 11: Pipe made of silicon carbide

Inner diameter; 9 cm; outer diameter: 10 cm; length: 200 cm;

Distance from the feedstock-supplying nozzle to the bottom opening: 100 cm;

Temperature distribution within the reactor:: Temperature of the uniform-temperature zone (uniformly heated zone) from the feedstock-supplying nozzle down to the position distant by 80 cm from the nozzle: 1120–1100° C.; and temperature of the temperature-reduced zone further down to the position distant by 20 cm from the uniformly heated zone: 1100–900° C.;

Composition of feedstock gas: 0.12 mol % of ferrocene, 0.10 mol % of thiophene, 5.80 mol % of toluene, 93.98 mol % of hydrogen;

Flow rate of the gas supplied from the feedstock-supplying nozzle: 2.60 liters/min.;

Flow rate of the carrier gas (hydrogen) supplied from the cooling gas-supplying nozzle: 8.0 liters/min.; and Flow rate of the carrier gas (hydrogen) supplied from the carrier gas-supplying nozzle: 7.0 liters/min.

(2) Discharge Pipe 31

Distance from the top opening to the bottom opening of the discharge pipe: 120 cm;

Length of the rectifiers, the top edges of which are included in the plane including the edge of the top opening of the discharge pipe: 5 cm;

Number of the rectifiers: 4;

Arrangement of the rectifiers: radially arranged around the axis of the discharge pipe;

Distance from the feedstock-supplying nozzle to the top opening of the discharge pipe: 80 cm;

Inner diameter of the discharge pipe: 4 cm;

Inner diameter of the top opening of the discharge pipe: 4.4 cm;

Pressure in the discharge pipe at the bottom opening thereof: −3 mmH$_2$O; and

Ejecting speed of the driving gas (mixture of air and nitrogen) from the driving gas-supplying nozzle: adjusted so as to obtain the above-mentioned pressure.

(3) Guide Gas-Supplying Means 40

Inner diameter of the gas uniform supply vessel: 20 cm;

Capacity of the gas uniform supply vessel: 15 liters/min.;

Flow rate of the guide gas (nitrogen) supplied from the guide gas-supplying nozzle: 15 liters/min.

Continuous operation of the apparatus for production of vapor-phase growth carbon fibers under the above-mentioned conditions was carried out for 5 hours. As a result, 23 grams of carbon nanofibers having a diameter of 20 nm, inner diameter of 5 nm and d$_{002}$ of 0.360 nm were obtained.

COMPARATIVE EXAMPLE

Carbon fibrous materials were produced with the same apparatus and under the same conditions as mentioned in Example 1 above, except that the discharge pipe was not used. In this example, fibrous materials were initially deposited in a spider-web form over the whole of the bottom opening of the furnace of tubular reactor. The inner pressure of the furnace of tubular reactor was greatly changed. The operation was continued for 10 minutes under such conditions, so that the inner pressure of the furnace of tubular reactor increased to 30 mmH$_2$O. Then, the operation was ceased, and the apparatus was purged with nitrogen gas and then opened.

As a result, the vapor-phase growth carbon fibers were not only deposited in a spider-web form over the whole of the bottom opening of the furnace of tubular reactor, but also a great amount of vapor-phase growth carbon fibers were deposited on the inside surface of the furnace of tubular reactor in the reaction zone thereof. On the bottom opening, the amount deposited was as small as 0.1 gram or less, the diameter varied within the range of 20–200 nm. On the other hand, on the inside surface of the reaction zone, the amount deposited was about 1 gram, and the diameter was as large as 100–400 nm. Thus, any objective fibers of 50 nm or less were nearly not obtained.

This comparative example reveals that the discharge pipe has a very important role for the apparatus for production of carbon fibers.

EXAMPLE 2

Carbon nanofibers were produced with the apparatus for production of vapor phase deposition carbon fibrous materials, as shown in FIG. 1, and under the following conditions.

(1) Vertical Furnace of tubular reactor 11: Pipe made of silicon carbide

Inner diameter: 9 cm; outer diameter: 10 cm; length: 200 cm.

Temperature distribution within the reactor:: Temperature in the zone between the top end and the position distant by 60 cm from the top end: a temperature gradient from 250° C. to 1120° C.; temperature in the zone between the positions distant by 60 cm and 160 cm, respectively, from the top end: nearly uniform at 1120° C. and temperature in the zone between the position distant by 160 cm from the top end and the bottom end: a temperature gradient from 600° C. to 1120° C.

(2) Feedstock-Supplying Nozzle 10

Nozzle 10 was made of a stainless steel of SUS304, and had an inner diameter of 14 mm and a length of 100 cm, and was surrounded by cooling jacket 12 made of SUS304, which was amounted coaxially with the nozzle to provide a double pipe structure. The outer diameter of cooling jacket 12 was 40 mm. The feedstock gas was allowed to pass through feedstock-supplying nozzle 10. The cooling gas, air, was allowed to pass through the ring-like space formed by the outside surface of feedstock-supplying nozzle 10 and the inside surface of cooling jacket 12. The temperature of the feedstock gas was controlled with the cooling gas at about 400° C. The cooling gas was exhausted at the cooling gas outlet 13A.

A rectifying honeycomb made of a heat resistant metal was inserted between the outside surface of cooling jacket 12 and the inside of furnace or tubular reactor 11.

Feedstock-supplying nozzle 10 was arranged in furnace of tubular reactor 11 in such a manner that the end of feedstock-supplying nozzle 10 was positioned to be distant by 60 cm from the top end of the furnace of tubular reactor.

(3) Discharge Pipe 31

Discharge pipe 31 was made of silicon carbide, and the straight part thereof was of 40 mm in inner diameter, 4 mm in thickness and 200 cm in length. A silicon carbide-made reducer of 43 mm in top end inner diameter, 40 mm in bottom end inner diameter and 50 mm in length was mated into the top of discharge pipe 31. The reducer was provided with four (4) silicon carbide-made plate rectifiers 44 of 4 mm thick, 88 mm in outer diameter and 50 mm in length, radially arranged outside.

The distance from the end of feedstock-supplying nozzle 10 to the top end of discharge pipe 31 was 30 cm, and the distance from the top end of furnace of tubular reactor 11 to the top end of discharge pipe 31 was 90 cm.

Discharge pipe 31 was arranged in such a manner that the bottom end of discharge pipe 31 was distant by about 65 cm the bottom of gas uniform supply vessel 41 of guide gas-supplying means 40 directly connected to furnace of tubular reactor 11.

Diluting nitrogen gas was allowed to flow at 20° C. and at a rate of 100 liters/min. through ejector 33 provided around the bottom end of discharging pipe 31, while the nitrogen gas was transferred together a large amount of air into a dust collector of a bag-filter type (not shown), on which were obtained the carbon nanofibers.

(4) Guide Gas-Supplying Means 40

Inner diameter of gas uniform supply vessel 41: 20 cm;
Capacity of gas uniform supply vessel 41: 15 liters;
Flow rate of the guide gas of nitrogen: 16 liters/min. at 20° C.; and
Pressure in gas uniform supply vessel 41: −6 mmH$_2$O.

(5) Other Conditions

Composition of feedstock gas: 0.12 mol % of ferrocene, 0.10 mol % of thiophene, 5.80 mol % of toluene and 93.98 mol % of hydrogen;
Flow rate of feedstock gas supplied from feedstock-supplying nozzle 10: 2.60 liters/min. at 20° C.;
Flow rate of hydrogen carrier gas supplied from carrier gas-supplying nozzle 14: 12.0 liters/min. at 20° C.;
Speed of feedstock gas through nozzle 10: 64.6 cm/sec. at 400° C. (Supposing the feedstock gas reached the top end of discharge pipe 10 at the unchanged speed, the retention time of the gas would be 0.46 second.);
Speed of the combined gas comprising the feedstock gas, carrier gas and guide gas in the discharge pipe: 186.6 cm/min. at 1120° C.

Supposing the gas was allowed to pass at the second above through the uniformly heated zone (100 cm), the retention time of the gas would be 0.38 second. Therefore, the reaction time was 0.84 second in total.

Operation of the apparatus as mentioned above was continued for 6 hours. As a result, 30 grams of carbon nanofibers having a diameter of 15–20 nm, inner diameter of 4–5 nm and d$_{002}$ of 0.35 nm, were obtained.

EXAMPLE 3

The same apparatus as mentioned in Example 2 was used to obtain carbon nanofibers, except that some conditions were changed as follows:

(1) Vertical furnace of tubular reactor 11

Temperature distribution within the reactor:: Temperature in the zone between the top end and the position distant by 60 cm from the top end: a temperature gradient from 270° C. to 1180° C.; temperature in the zone between the positions distant by 60 cm and 160 cm, respectively, from the top end: nearly uniform at 1180° C.; temperature in the zone between the position distant by 160 cm from the top end and the bottom end: a temperature gradient of 1180–650° C.

(2) Discharge Pipe 31

Distance from the end of feedstock-supplying nozzle 10 to the top end of discharge pipe 31: 10 cm;
Distance from the top end of furnace of tubular reactor 11 to the top end of discharge pipe 31: 70 cm (Supposing the feedstock gas reached the top end of discharge pipe 10 at the unchanged speed, the retention time of the gas would be 0.15 second.);
Ejecting speed from feedstock-supplying nozzle 10: 64.6 cm/sec. at 400° C.;
Speed of the feedstock gas, carrier gas and guide gas in total through the discharge pipe: 194.6 cm/sec. at 1180° C.

Supposing the gas was allowed to flow at this speed through the uniformly heated zone (100 cm), the retention time of the gas would be 0.46 second. Therefore, the reaction time was 0.61 second.

Operation of the apparatus as mentioned above was continued for 4 hours. As a result, 40 grams of carbon nanofibers having a diameter of 8–30 nm, inner diameter of 2–5 nm and d002 of 0.36 nm, were obtained.

EXAMPLE 4

Carbon nanofibers were obtained under the following conditions in the same apparatus as shown in FIG. 1 and used in Example 2, except that there were primary differences in that three (3) feedstock-supplying nozzles 10 and three (3) discharge pipes 31 were provided, and a discharged gas-recovering means was provided:

(1) Vertical Furnace of tubular reactor 11

Temperature distribution within the reactor:: Temperature in the zone between the top end and the position distant by 60 cm from the top end: a temperature gradient from 230° C. to 1150° C.; temperature is the zone between the positions distant by 60 cm and 160 cm, respectively, from the top end: nearly uniform at 1150° C.; temperature in the zone between the position distant by 160 cm from the top end and the bottom end: a temperature gradient of 1150–650° C.

(2) Feedstock-Supplying Nozzle 10

Cooling jacket 12 made of SUS304 was coaxially arranged around the feedstock-supplying nozzles made of SUS304 and of 12 mm in inner diameter and 80 cm in length to constitute the double pipe structure. The cooling jacket had an outer diameter of 36 mm. The cooling gas, air, was allowed to pass through the ring-like space formed by the outside surface of feedstock-supplying nozzle 10 and the inside surface of cooling jacket 12. The temperature of the feedstock gas was controlled with the cooling gas at about 400° C.

Thus, three sets of a double pipe structure, a set of which comprises one of the feedstock-supplying nozzles and one of the cooling jackets, were arranged in parallel in the upper portion of the furnace of tubular reactor, in such a manner that the three central points of the pipes on the same cross-sectional plane were the vertices of an equilateral triangle when connected to each other and distant by 39 mm from each other. A rectifying honeycomb made of a heat resistant metal was designed in such a manner that the bottom end of this honeycomb and the bottom ends of the three sets of a double pipe structure were on the same plane, and inserted between the inside surface of the furnace of tubular reactor and the outside surface of the cooling jacket. Furthermore, the bottom ends of the three sets were distant by 50 cm from the top end of the furnace of tubular reactor.

(3) Discharge Pipe 31

Discharge pipe 31 was made of silicon carbide, and the straight part thereof was of 28 mm in inner diameter, 3 mm in thickness and 200 cm in length. A silicon carbide-made reducer of 31 mm in top end inner diameter, 28 mm in bottom end inner diameter and 50 mm in length was mated into the top of discharge pipe 31. The reducer was provided with two (2) silicon carbide-made plate rectifier plates of 15 mm wide, 4 mm thick and 50 mm in length, radially arranged outside.

Three (3) of the thus formed discharge pipes were arranged in the furnace of tubular reactor, in such a manner that they corresponded to the three sets above, respectively. The distance between the openings of the feedstock-supplying nozzles and the top openings of the discharge pipes was 20 cm. The distance between the top end of the furnace of tubular reactor and the top openings of the discharge pipes was 70 cm.

The discharge pipes were arranged in such a manner that the bottom end openings thereof were projected through the bottom of the gas uniform supply vessel of the guide gas-supplying means, at the position thereof distant by 45 cm from the bottom of the vessel.

The bottom ends of the three discharge pipes were connected to an exhausting gas-recovering means, which was comprised of a 2 m$^3$ stainless steel-made container, a stainless steel-made mesh filter of a movable type and of a mesh opening size of about 1 mm provided 10 cm below the bottom ends of the discharge pipes in the container, a 200 liters/min. ventilating fan arranged in such a manner that the outlet of the fan were about 10 cm below the mesh filter, an exhausting fan connected to a differential minute pressure gauge, and a gas recovery tank for recovering an unreacted product-containing carrier gas and the guide gas after passing through the container.

The mesh filter having the carbon nanofibers deposited thereon can move from the position underneath the discharge pipes to a prescribed position. The carbon nanofibers on the filter are scratched away with a brush during moving of the filter, and then recovered. The filter is designed so that it can return to the position underneath the discharge pipes.

(4) Guide Gas-Supplying Means 40

Inner diameter of gas uniform supply vessel 41: 20 cm;

Capacity of gas uniform supply vessel 41: 15 liters;

Flow rate of the guide gas (nitrogen): 16 liters/min. at 20; and

Pressure in gas uniform supply vessel 41: −6 mmH$_2$O.

(5) Other conditions

Composition of feedstock gas: 0.06 mol % of ferrocene, 0.04 mol % of thiophene, 5.90 mol % of toluene and 94.00 mol % of hydrogen;

Flow rate of feedstock gas supplied from feedstock-supplying nozzle 10: 1.50 liter/min.;

Flow rate of hydrogen carrier gas supplied from carrier gas-supplying nozzle 14: 9.0 liters/min.;

Speed of feedstock gas through nozzle 10: 50.8 cm/sec. at 400° C. Supposing the feedstock gas reached the top end of the discharge pipe at this speed, the retention time of the gas would be 0.39 second;

Speed of the combined gas comprising the feedstock gas, carrier gas and guide gas in the discharge pipe: 124.7 cm/min. at 1150° C.

Supposing the gas was allowed to pass at the speed above through the uniformly heated zone (100 cm), the retention time of the gas would be 0.72 second. Therefore, the retention time was 1.11 second in total.

Operation of the apparatus as mentioned above was continued for 30 minutes. As a result, 10 grams of carbon nanofibers having a diameter of 5–20 nm, inner diameter of 2–5 nm and d$_{002}$ of 0.35 nm, were obtained.

EXAMPLE 5

Carbon nanofibers were obtained under the following conditions in the same apparatus as shown in FIG. 2.

(1) Vertical Furnace of tubular reactor 11

Temperature distribution within the reactor:: Temperature in the zone between the top end and the position distant by 60 cm from the top end: a temperature gradient from 100° C. to 600° C.; temperature in the zone between the positions distant by 60 cm and 160 cm, respectively, from the top end: nearly uniform at 600° C.; temperature in the zone between the position distant by 160 cm from the top end and the bottom end: a temperature gradient of 600–500° C.

(2) Feedstock-Supplying Nozzle 10

The same description as in Example 2 is made herein, and the feedstock gas supplied from feedstock-supplying nozzle 10 was controlled at a temperature of 100° C.

(3) Discharge Pipe 31

The same description as in Example 2 is made herein, except that a 100 mesh metal net was substituted for the dust collector of a bag-filter type for collecting the fine vapor-phase growth carbon fibers.

(4) Guide Gas-Supplying Means 40

The same description as in Example 2 is made herein.

(5) Other Conditions

Composition of feedstock gas: 1 mol % of ferropentacarbonyl, 75 mol % of carbon monoxide and 24 mol % of hydrogen;

Flow rate of feedstock gas supplied from feedstock-supplying nozzle 10: 1.2 liter/min. at 20° C.;

Flow rate of hydrogen carrier gas supplied from carrier gas-supplying nozzle 14: 10.8 liters/min. at 20° C.;

Speed of feedstock gas through nozzle 10: 16.5 cm/sec. at 100° C. Supposing the feedstock gas reached the top end (30 cm) of discharge pipe 10 at this speed, the retention time of the gas would be 1.82 second;

Speed of the combined gas comprising the feedstock gas, carrier gas and guide gas in the discharge pipe: 82.5 cm/min. at 600° C.

Supposing the gas was allowed to pass at the speed above through the uniformly heated zone (100 cm), the retention time of the gas would be 0.85 second. Therefore, the reaction time was 2.67 second in total.

Operation of the apparatus as mentioned above was continued for 30 minutes. As a result, 2 grams of carbon nanofibers were obtained. Observation of the resulting products with SEM/TEM revealed that they contain a major part of carbon fibers of a ribbon shape having a graphite network plane perpendicular to the axis of fiber and having a major diameter of 10–40 nm, and further contain no small amount of carbon fibers having an outer diameter of about 30 nm, inner diameter of 5–8 nm and a graphite network plane inclined at 45° to the axis of fiber. Furthermore, it was also observed that the products contain a very small amount of hollow carbon nanotubes having a graphite network plane having an outer diameter of about 10 nm. X-ray analysis of the resulting products containing the carbon nanotubes revealed that they have d$_{002}$ of 0.34 nm.

INDUSTRIAL ADVANTAGES OF THE INVENTION

This invention makes it possible to prevent blocking of the lower portion of the vertical furnace of tubular reactor with carbon fibers, particularly carbon nanofibers, and therefore, to realize efficient and continuous production of carbon fibers. Furthermore, this invention provides a small size apparatus for production of carbon fibers or vapor-phase growth carbon fibers.

Still further, this invention further can provide a process or apparatus for efficient and continuous production of carbon fibrous materials having a growth ring-shaped cross section, particularly carbon nanofibers or nanotubes having a smaller diameter than that of the vapor-phase growth carbon fibers.

In the apparatus for production of vapor-phase growth carbon fibers according to this invention, the discharge pipe is inserted in the vertical furnace of tubular reactor in such a manner that the opening of the discharge pipe faces the opening of the feedstock-supplying nozzle. Therefore, the feedstock gas, which is cooled with the cooled feedstock-supplying nozzle, can rapidly be heated and decomposed in the reaction zone of the furnace of tubular reactor, thus efficiently producing the vapor-phase growth carbon fibers.

This invention can provide a device for preventing blocking of the furnace of tubular reactor by deposition of vapor-phase growth carbon fibers on the inside surface of the furnace of tubular reactor.

This invention can provide vapor-phase growth carbon fibers including so-called carbon nanofibers or nanotubes, having a diameter of less than about 100 nm, or less than 50 nm, further having a central hollow core along the axis of fiber, which is surrounded by one or more layers of graphite network planes to form a wood growth ring-like shape, and having a lattice distance, $d_{002}$, within the range of 0.336–0.360 nm.

What is claimed is:

1. An apparatus for production of carbon fibrous materials, comprising:
    a reactor means including a furnace of tubular reactor having a reaction zone for production of the carbon fibrous materials by thermal decomposition of a gaseous carbon source and a metal catalyst source, and a feedstock-supplying means for supplying the carbon source and the metal catalyst source to the furnace of tubular reactor;
    a discharging means including a discharge pipe having a first opening for charging at least one of the carbon fibrous materials and the carbon source/metal catalyst source and a second opening for discharging the carbon fibrous materials to an outside, the discharge pipe positioned at least partially within the furnace of tubular reactor, and the discharging means being positioned so as to have the first opening of the discharge pipe face in close proximity to the reaction zone; and
    a guide gas-supplying means for supplying a guide gas in such a manner that the guide gas flows countercurrent to a gas in the discharge pipe and then through the inside of the discharge pipe.

2. The apparatus according to claim 1, wherein the furnace of tubular reactor is of a vertical type and has the feedstock-supplying means at a top of the reactor means and the discharging means at a bottom of the reactor means.

3. An apparatus according to claim 1, further including a heater around the furnace.

4. The apparatus according to claim 2, wherein said feedstock-supplying means comprises a feedstock-supplying nozzle for supplying and metal catalyst source and said carbon source into said furnace of tubular reactor and a carrier gas-supplying nozzle.

5. An apparatus according to claim 4, further comprising a cooling jacket around the outside circumference of said feedstock-supplying nozzle, wherein a cooling gas is introduced into and allowed to pass through said cooling jacket, and wherein a carrier gas introduced into said furnace through said carrier gas-supplying nozzle flows between the inside surface of said furnace and the outside surface of said cooling jacket.

6. The apparatus according to claim 2, wherein said discharge pipe has a diameter unchanged throughout the entire length of said pipe, and the inner diameter of said first opening is 1.3 to 10 times as large as the inner diameter of said feedstock-supplying nozzle.

7. The apparatus according to claim 2, wherein said discharge pipe has different diameters between said first opening and said second opening, and the inner diameter of said first opening is 1.1 to 10 times as large as the inner diameter of said feedstock-supplying nozzle.

8. The apparatus according to claim 2, wherein the top end of said discharge pipe has a shape of a funnel, the larger opening of which faces said feed stock-supplying nozzle.

9. The apparatus according to claim 1, said discharging means further comprising an exhaust device for exhausting gases in said discharge pipe and a collecting device for collecting said carbon fibrous material.

10. The apparatus according to claim 2, wherein said guide gas-supplying means comprises:
    a guide gas uniform supply vessel for storing the guide gas, said guide gas uniform supply vessel having an opening at the top thereof and being connected with the bottom of said furnace of tubular reactor, wherein said discharge pipe lies through said vessel;
    a guide gas supply pipe communicating with the inside of said guide gas uniform supply vessel, for introducing said guide gas into said inside of said guide gas uniform supply vessel; and
    a gas flow regulating part located at said top of said guide gas uniform supply vessel at around the connected part of said vessel and said furnace.

11. The apparatus according to claim 10, wherein said guide gas uniform supply vessel has an upper transition part and a lower part, the diameter of said upper transition part gradually increasing from the connected part to said lower part so as to achieve a sealed connection between said vessel and said furnace; the section of said lower part, vertical to the axis of said discharge pipe, has a shape of a circle and the diameter of said circle is 1.1 to 4 times as large as the inner diameter of said furnace of tubular reactor.

12. The apparatus according to claim 10, wherein said gas flow regulating part is provided with rectifiers, said rectifiers being placed in a space between the inside surface of said furnace of tubular reactor and the outside surface of said discharge pipe so that said rectifiers extend in a radial direction from the axis of said discharge pipe to the inside surface of said furnace.

13. A device for preventing carbon fibrous materials from being deposited, comprising:
    a discharging means including a discharge pipe for taking at least one of the carbon fibrous materials, a carbon source and a metal catalyst source into the discharge pipe at an opening of the discharge pipe and then discharging the carbon fibrous materials to an outside of the discharging means, the discharge pipe being positioned to have the opening face in close proximity to a reaction zone for producing the carbon fibrous materials, and the discharge pipe being positioned to be at least partially within the furnace of tubular reactor; and
    a guide gas-supplying means for allowing a guide gas to pass through an end of the furnace or tubular reactor spaced from the opening of the discharge pipe, the opening of the discharge pipe and then an inside of the discharge pipe, wherein the gas passes through the end of the furnace in a direction countercurrent to the direction of flow of gas through the discharge pipe.

* * * * *

UNITED STATES PATENT AND TRADEMARK OFFICE
CERTIFICATE OF CORRECTION

PATENT NO. : 6,878,360 B1
DATED : April 12, 2005
INVENTOR(S) : Ohsaki et al.

It is certified that error appears in the above-identified patent and that said Letters Patent is hereby corrected as shown below:

Column 27,
Line 43, "for supplying and" should read -- for supplying said --.

Column 28,
Line 29, "of a circle" should read -- of a circle; --.
Line 54, "furnace or tubular reactor" should read -- furnace of tubular reactor --.

Signed and Sealed this

Twentieth Day of September, 2005

JON W. DUDAS
*Director of the United States Patent and Trademark Office*